(12) United States Patent
Aketagawa et al.

(10) Patent No.: US 10,576,427 B2
(45) Date of Patent: Mar. 3, 2020

(54) METHOD AND APPARATUS FOR CLEANING FILTER MEMBRANE, AND WATER TREATMENT SYSTEM

(71) Applicant: MITSUBISHI ELECTRIC CORPORATION, Chiyoda-ku (JP)

(72) Inventors: Kyohei Aketagawa, Chiyoda-ku (JP); Nozomu Yasunaga, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 167 days.

(21) Appl. No.: 15/329,369

(22) PCT Filed: Jun. 1, 2015

(86) PCT No.: PCT/JP2015/065786
§ 371 (c)(1),
(2) Date: Jan. 26, 2017

(87) PCT Pub. No.: WO2016/031331
PCT Pub. Date: Mar. 3, 2016

(65) Prior Publication Data
US 2017/0216777 A1  Aug. 3, 2017

(30) Foreign Application Priority Data

Aug. 29, 2014 (JP) .................. 2014-175329

(51) Int. Cl.
*B01D 61/20* (2006.01)
*B01D 65/02* (2006.01)
(Continued)

(52) U.S. Cl.
CPC ............ *B01D 65/02* (2013.01); *B01D 61/20* (2013.01); *C02F 1/444* (2013.01); *C02F 3/1268* (2013.01);
(Continued)

(58) Field of Classification Search
None
See application file for complete search history.

(56) References Cited

U.S. PATENT DOCUMENTS

| | | | | |
|---|---|---|---|---|
| 2008/0203035 A1* | 8/2008 | Yasunaga | ................ | C02F 1/722 210/759 |
| 2013/0306559 A1 | 11/2013 | Kantani et al. | | |
| 2015/0298179 A1* | 10/2015 | Suematsu | ............... | B08B 9/032 134/22.11 |

FOREIGN PATENT DOCUMENTS

| | | | | |
|---|---|---|---|---|
| EP | 2724792 A1 * | 4/2014 | ............ | B08B 9/032 |
| JP | 4-310220 A | 11/1992 | | |

(Continued)

OTHER PUBLICATIONS

Park, Young G.—Effect of ozonation for reducing membrane-fouling in the UF membrane—Desalination 147 (2002) 43-48 (Year: 2002).*

(Continued)

*Primary Examiner* — Bradley R Spies
(74) *Attorney, Agent, or Firm* — Oblon, McClelland, Maier & Neustadt, L.L.P.

(57) ABSTRACT

A method for cleaning a filter membrane in which at least 2 types of cleaning water containing oxidizing agents are prepared, and the filter membrane is cleaned using the cleaning water in an ascending order of the oxidizabilities of the oxidizing agents. Moreover, an apparatus for cleaning a filter membrane of the present invention comprises a means for cleaning the filter membrane using at least 2 types of cleaning water containing oxidizing agents, and the filter membrane is cleaned using the cleaning water in an ascending order of the oxidizabilities of the oxidizing agents. The method and the apparatus for cleaning a filter membrane can efficiently remove polluting substances adhered to a filter membrane while reducing the amounts of oxidizing agents (Continued)

and water to be used, and can maintain the filtration performance for a long period of time.

7 Claims, 15 Drawing Sheets

(51) Int. Cl.
*C02F 1/44* (2006.01)
*C02F 1/76* (2006.01)
*C02F 1/78* (2006.01)
*C02F 3/12* (2006.01)
*B01D 61/18* (2006.01)

(52) U.S. Cl.
CPC ............ *C02F 3/1273* (2013.01); *B01D 61/18* (2013.01); *B01D 2315/06* (2013.01); *B01D 2321/04* (2013.01); *B01D 2321/12* (2013.01); *B01D 2321/164* (2013.01); *B01D 2321/168* (2013.01); *C02F 1/76* (2013.01); *C02F 1/78* (2013.01); *C02F 2201/782* (2013.01); *C02F 2301/08* (2013.01); *C02F 2303/14* (2013.01); *C02F 2303/16* (2013.01); *Y02W 10/15* (2015.05)

(56) References Cited

FOREIGN PATENT DOCUMENTS

| JP | 08266875 A | * | 10/1996 |
|----|----|----|----|
| JP | 9-313902 A | | 12/1997 |
| JP | 10-244276 A | | 9/1998 |
| JP | 11-9973 A | | 1/1999 |
| JP | 2001-70763 | | 3/2001 |
| JP | 2001-70763 A | | 3/2001 |
| JP | 2002-361054 A | | 12/2002 |
| JP | 2003-326258 | | 11/2003 |
| JP | 2003-326258 A | | 11/2003 |
| JP | 2004-141724 | | 5/2004 |
| JP | 2004-209478 A | | 7/2004 |
| JP | 2005-34694 | | 2/2005 |
| JP | 2005-52689 | | 3/2005 |
| JP | 2007-83155 | | 4/2007 |
| JP | 2007083155 A | * | 4/2007 |
| JP | 2009-82858 A | | 4/2009 |
| WO | 2012/077506 A1 | | 6/2012 |
| WO | WO-2014069259 A1 | * | 5/2014 ............ B08B 9/032 |

OTHER PUBLICATIONS

Kato, Yasuhiro—Machine Translation of JP 2007083155—Apr. 5, 2007 (Year: 2007).*
Soeda, Yuji et al—Machine Translation of JP H08266875—Oct. 15, 1996 (Year: 1996).*
International Search Report dated Aug. 11, 2015 in PCT/JP2015/065786 filed Jun. 1, 2015.
Search Report and Written Opinion dated Oct. 5, 2017 in Singaporean Patent Application No. 11201700625R.

* cited by examiner

METHOD AND APPARATUS FOR CLEANING FILTER MEMBRANE, AND WATER TREATMENT SYSTEM

TECHNICAL FIELD

The present invention relates to a method and an apparatus for cleaning a filter membrane, and a water treatment system, which are used for filtration treatment of water to be treated including the water of waterworks, the water of sewerage, industrial water, and various types of waste water.

BACKGROUND ART

Filtration treatment using filter membranes is employed as a method for removing polluting substances from water to be treated. For example, in the case of sewerage, biological treatment is performed by an activated sludge process and the like, and then polluting substances such as organic substances are separated and removed using filter membranes. Cylindrical microfiltration membranes or ultrafiltration membranes are generally used as filter membranes. Moreover, examples of filtration modes include an external pressure filtration mode that involves causing water to be treated to flow outside the cylindrical filter membrane and causing filtrate water to flow inside same, an internal pressure filtration mode that involves causing water to be treated to flow inside the cylindrical filter membrane and causing filtered water to flow outside same. Filtration treatment in which such a cylindrical filter membrane is used is problematic in that as the filter membrane is continuously used, filtration performance decreases. Specifically, as a filter membrane is continuously used, polluting substances adhere to the surface (outer surface in the external pressure filtration mode, and inner surface in the internal pressure filtration mode) of the filter membrane that comes into contact with water to be treated, the surface (inner surface in the external pressure filtration mode, and outer surface in the internal pressure filtration mode) of the filter membrane or into the pores of the membrane that comes into contact with filtered water, thereby causing fouling and a gradual decrease in filtration performance. In particular, when fouling takes place on a filter membrane, the pressure required at the time of filtration increases, and thus the membrane filtration flux (the amount of water that passes through the filtration membrane per unit of time and per unit area of membrane) also decreases. Therefore, periodic cleaning of a filter membrane is required to maintain its performance.

Hence, as a method for maintaining filtration performance, backflow cleaning is performed, by which filtered water and cleaning water such as clear water are passed from the filtered water side opposite to the filtration direction of the filter membrane through the filter membrane, so as to physically remove polluting substances adhered to the surface of the filter membrane that comes into contact with water to be treated. Moreover, to increase the effect of removing polluting substances, a method for backflow cleaning using cleaning water containing an oxidizing agent such as sodium hypochlorite and ozone, in which the polluting substances that are chemically adhered with intermolecular forces to the surface of a filter membrane or into the pores of the membrane contacting with filtered water are oxidatively degraded and removed, has been proposed (for example, see Patent Documents 1 and 2). Another method that has been proposed involves oxidatively degrading polluting substances chemically adhered to the surface of a filter membrane or into the pores of the membrane that comes into contact with filtered water using cleaning water containing an oxidizing agent, and then blowing air containing ozone over the surface of the filter membrane that comes into contact with water to be treated, thereby removing polluting substances adhered to the filter membrane (for example, see Patent Document 3). Furthermore, another method that has been proposed involves contacting hydrogen peroxide with ozone within a filter membrane, generating a radical such as a hydroxyl radical with oxidizability higher than that of ozone, to thus remove polluting substances adhered to the surface of the filter membrane that comes into contact with water to be treated, the surface of the filter membrane or into the pores of the membrane that comes into contact with filtered water via oxidative degradation (for example, see Patent Document 4).

REFERENCES

Patent Documents

Patent Document 1: JP 9-313902 A
Patent Document 2: JP 4-310220 A
Patent Document 3: JP 2002-361054 A
Patent Document 4: JP 2003-326258 A

DISCLOSURE OF THE INVENTION

Problems to be Solved by the Invention

However, conventional methods used for cleaning filter membranes are problematic, particularly in that the filtration performance of a filter membrane cannot be sufficiently recovered because of their limited effect in cleaning the surface of a filter membrane or the interior of the pores of the membrane that comes into contact with filtered water.

Specifically, a conventional method that involves cleaning a filter membrane by backflow cleaning using cleaning water independently containing an oxidizing agent such as sodium hypochlorite or ozone is problematic in that polluting substances chemically adhered to the surface of a filter membrane or into the pores of the membrane that comes into contact with filtered water cannot be efficiently removed, and the filtration performance of the cleaned filter membrane decreases immediately. In fact, filter membranes cleaned by backflow cleaning according to conventional methods exhibited rapid decreases in membrane filtration flux, and immediate decreases in the filtration efficiency of the filter membranes. Moreover, sufficient removal of polluting substances chemically adhered to the surface of a filter membrane or into the pores of the membrane that comes into contact with filtered water requires lengthy cleaning using a large amount of water containing large amounts of oxidizing agents, resulting in increased amounts of oxidizing agents and water to be used herein.

In the meantime, when a plurality of oxides are used in combination, not only does degradation of polluting substances chemically adhered to the surface of a filter membrane or into the pores of the membrane that comes into contact with filtered water occur, but also complicated reactions take place among oxides, so that, in addition to the increased consumption of oxides, degradation alone of polluting substances cannot be selectively accelerated. As a result, polluting substances chemically adhered to the surface of a filter membrane or into the pores of the membrane that comes into contact with filtered water cannot be efficiently removed.

The present invention has been made to solve the above problems, and an objective of the present invention is to provide a method and an apparatus for cleaning a filter membrane, and a water treatment system, by which not only polluting substances adhered to the surface of a filter membrane that comes into contact with water to be treated, but also polluting substances adhered to the surface of a filter membrane or into the pores of the membrane that comes into contact with filtered water can be efficiently removed and the filtration performance can be maintained for a long period of time while reducing the amounts of oxidizing agents and water to be used.

Means for Solving the Problems

As a result of intensive studies of the cleaning of polluting substances adhered to the surface of a filter membrane that comes into contact with water to be treated, and to the surface of a filter membrane and into the pores of the membrane that comes into contact with filtered water, the present inventors have discovered that the above problems can be solved by preparing at least 2 types of cleaning water separately containing oxidizing agents differing in oxidizability, and cleaning a filter membrane using cleaning water in an ascending order of the oxidizabilities of the oxidizing agents, and thus have completed the present invention.

Specifically, the present invention is a method for cleaning a filter membrane, which is characterized by preparing at least 2 types of cleaning water containing oxidizing agents, and then cleaning the filter membrane using these types of cleaning water in an ascending order of the oxidizabilities of the oxidizing agents.

Furthermore, the present invention is an apparatus for cleaning a filter membrane, which comprises a means for cleaning the filter membrane using at least 2 types of cleaning water containing oxidizing agents, characterized by cleaning the filter membrane using these types of cleaning water in an ascending order of the oxidizabilities of the oxidizing agents.

Furthermore, the present invention is a water treatment system comprising a filtration device for filtering water to be treated and the above apparatus for cleaning a filter membrane, which is characterized by using filtered water resulting from filtration by the above filtration device as cleaning water for use in the above apparatus for cleaning a filter membrane.

Effects of the Invention

According to the present invention, a method and an apparatus for cleaning a filter membrane and a water treatment system can be provided, by which not only polluting substances adhered to the surface of a filter membrane that comes into contact with water to be treated, but also polluting substances chemically adhered to the surface of a filter membrane or into the pores of the membrane that comes into contact with filtered water can be efficiently removed while reducing the amounts of oxidizing agents and water to be used, and filtration performance can be maintained for a long period of time.

BEST MODE FOR CARRYING OUT THE INVENTION

Embodiment 1

Figure 1:
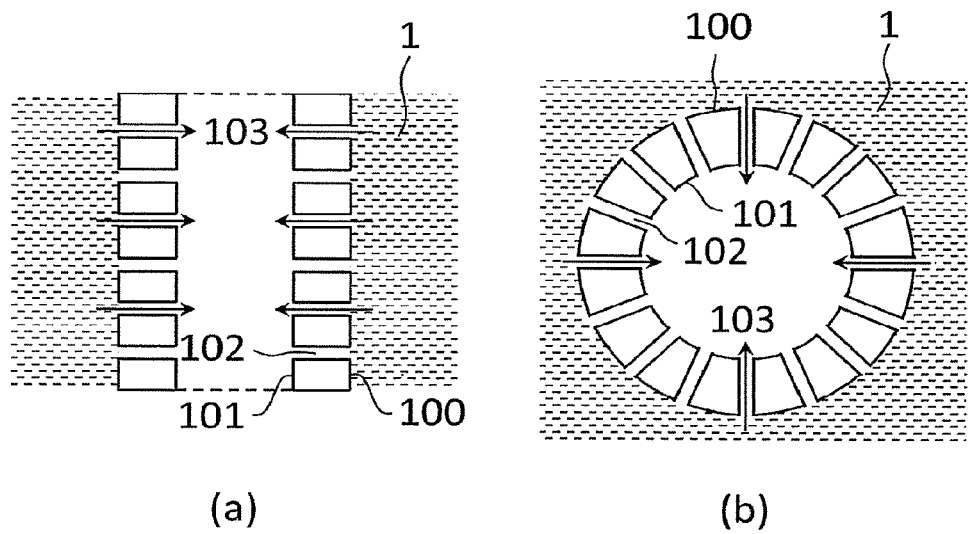
FIG. 1 shows cross sections of a filter membrane in an external pressure filtration mode.

The method for cleaning a filter membrane according to this embodiment is characterized by cleaning a filter membrane using at least 2 types of cleaning water containing oxidizing agents in an ascending order of the oxidizabilities of the oxidizing agents. The term "oxidizability" as used herein can be defined depending on the strength of standard oxidation-reduction potential measured at 25° C. using a hydrogen electrode. For example, "an oxidizing agent with low oxidizability" refers to an oxidizing agent with a low standard oxidation-reduction potential (25° C.). Moreover, "an oxidizing agent with high oxidizability" refers to an oxidizing agent with a high standard oxidation-reduction potential (25° C.).

Cleaning water to be used for the method for cleaning a filter membrane according to the embodiment is not particularly limited, as long as there is 2 or more types of cleaning water. When there are too many types of cleaning water, the types of oxidizing agent to be used for each cleaning water must be increased. Accordingly, the types of cleaning water to be used for the method for cleaning a filter membrane according to the embodiment is preferably 2 or 3, and more preferably 2, in view of reducing cleaning costs.

Hereinafter, a method for cleaning a filter membrane using 2 types of cleaning water is described in detail as an example. It goes without saying that a method for cleaning a filter membrane using 3 or more types of cleaning water can also be used herein.

The method for cleaning a filter membrane according to the embodiment is characterized by cleaning a filter membrane using cleaning water containing a $1^{st}$ oxidizing agent, and then cleaning the filter membrane using cleaning water containing a $2^{nd}$ oxidizing agent with oxidizability higher than that of the $1^{st}$ oxidizing agent.

Here, a way of cleaning a filter membrane is not limited to backflow cleaning that involves ejecting cleaning water in a direction opposite to the filtration direction of a filter membrane for cleaning. A cleaning method that involves passing cleaning water through a filter membrane, and then keeping the cleaning water intact within the membrane, as well as a cleaning method that involves immersing a filter membrane in a cleaning solution and keeping the resultant can be employed, for example.

Moreover, filter membranes that are the subject of the method for cleaning a filter membrane according to the embodiment are filter membranes with polluting substances adhered to the surface thereof or into the pores thereof after filtration of water to be treated such as the water of waterworks, the water of sewerage, sewage secondary effluent, industrial waste water, seawater, and night soil.

The material of a filter membrane that can be used in the method for cleaning a filter membrane of the embodiment is not particularly limited, as long as it does not deteriorate due to oxidizing agents. Examples of the material of a filter membrane include: polyolefins such as polyethylene, polypropylene, and polybutene; fluorine-based resin compounds such as tetrafluoroetylene-perfluoroalkylvinylether copolymer (PFA), tetrafluoroethylene-hexafluoropropylene copolymer (FEP), tetrafluoroethylene-ethylene copolymer (ETFE), polychlorotrifluoroethylene (PCTFE), chlorotrifluoroethylene-ethylene copolymer (ECTFE), polyvinylidene fluoride (PVDF), and polytetrafluoroethylene (PTFE); celluloses such as cellulose acetate and ethyl cellulose; and ceramic. In particular, the material of a filter membrane is preferably a fluorine-based resin compound with good resistance to strong oxidizing agents such as ozone. In addition, the material of a filter membrane may be a single one of the above substances or a combination of 2 or more of the above substances.

The types of filter membrane are not particularly limited and various filter membranes known in the art, such as a microfiltration (MF) membrane and an ultrafiltration (UF) membrane can be used.

The average pore diameter of a filter membrane is not particularly limited and preferably ranges from 0.001 μm to 1 μm, and more preferably ranges from 0.01 μm to 0.8 μm. Not only polluting substances adhered to the surface of a filter membrane that comes into contact with water to be treated, but also polluting substances chemically adhered to the surface of a filter membrane or into the pores of the membrane that comes into contact with filtered water can be efficiently removed by the method for cleaning a filter membrane of the embodiment, as long as the filter membrane has an average pore diameter within this range.

The shape of a filter membrane is not particularly limited, and a filter membrane may be formed into any shape known in the art such as a cylindrical shape and a flat membranous shape. In particular, the shape of a filter membrane is preferably cylindrical. In addition, a filter membrane may be incorporated into a membrane module, and as a membrane module, an immersion-type membrane module, a casing-type membrane module, a monolith-type membrane module or the like can be employed. Furthermore, regarding filtration modes for a filter membrane, either a full flow filtration mode or a cross flow filtration mode can be used.

Figure 2:
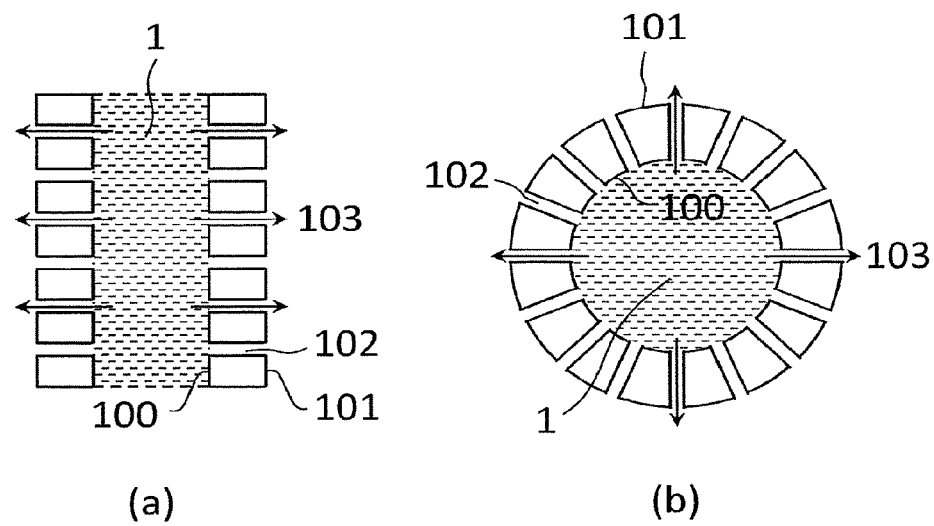
FIG. 2 shows cross sections of a filter membrane in an internal pressure filtration mode.

The passing water mode for a filter membrane is not particularly limited and may be either an external pressure filtration mode that involves causing water to be treated to flow outside the filter membrane and causing filtered water to flow inside same, or an internal pressure filtration mode that involves causing water to be treated to flow inside the filter membrane, and causing filtered water to flow outside same. FIG. 1 shows cross sections of a filter membrane in the external pressure filtration mode. FIG. 2 shows cross sections of a filter membrane in the internal pressure filtration mode. In FIG. 1 and FIG. 2, (a) is an enlarged vertical cross-section of the filter membrane and (b) is an enlarged horizontal cross-section of the filter membrane.

As shown in FIG. 1 and FIG. 2, the filter membrane comprises a surface 100 that comes into contact with water to be treated 1, a surface 101 that comes into contact with filtered water 103, and pores 102 through which filtered water 103 flows. In a filter membrane in the external pressure filtration mode, water to be treated 1 is caused to flow outside the filter membrane, and filtered water 103 flows into the filter membrane (in the direction of the arrows). On the other hand, in a filter membrane in the internal pressure filtration mode, water to be treated 1 is caused to flow inside the filter membrane, and filtered water 103 flows to the outside (in the direction of the arrows) of the filter membrane.

Therefore, the expression "the surface 100 of a filter membrane that comes into contact with water to be treated 1" as used herein refers to the outer surface of the filter membrane in the case of the external pressure filtration mode, and to the inner surface of the filter membrane in the case of the internal pressure filtration mode. Moreover, the expression "the surface 101 of a filter membrane that comes into contact with filtered water 103" as used herein refers to the inner surface of the filter membrane in the case of the external pressure filtration mode, and to the outer surface of the filter membrane in the case of the internal pressure filtration mode. Moreover, the term "in (into) the pores 102 of the filter membrane" as used herein refers to the interior of the pores 102 of the filter membrane through which filtered water 103 flows, and refers particularly to the internal surfaces of the pores 102. In addition, the term "the surface of a (the) filter membrane" is a concept such that the term is intended to include both the surface 100 that comes into contact with water to be treated 1 and the surface 101 that comes into contact with filtered water 103.

Polluting substances adhered to the surface 100 of a filter membrane that comes into contact with water to be treated 1 are organic matters deposited due to filtration treatment, and thus can be physically removed easily. On the other hand, physical removal of polluting substances adhered to the surface 101 of a filter membrane or into the pores 102 of the membrane that comes into contact with filtered water 103 is difficult, because of the chemical adhesion thereof via intermolecular forces or the like. Polluting substances adhered to the surface 101 of the filter membrane or into the pores 102 of the membrane that comes into contact with filtered water 103 are generally soluble organic matters, and thus can be removed by oxidative degradation using oxidizing agents. Soluble organic matter is broadly classified into two categories: easily degradable organic matter that can be oxidatively degraded easily; and refractory organic matter, the oxidative degradation of which is difficult.

When a filter membrane is cleaned by using cleaning water containing a $1^{st}$ oxidizing agent with low oxidizability, easily degradable organic matter can be removed by oxidative degradation, but refractory organic matter cannot be oxidatively degraded and thus cannot be removed. However, the $1^{st}$ oxidizing agent chemically acts on the refractory organic matter, so as to be able to lower the adhesion of the refractory organic matter to a filter membrane or to alter the refractory organic matter. Subsequently, when the filter membrane is cleaned by using cleaning water containing a $2^{nd}$ oxidizing agent with high oxidizability, reactivity between the $2^{nd}$ oxidizing agent and the refractory organic matter is improved, facilitating the oxidative degradation and removal of the refractory organic matter. Therefore, when a filter membrane is cleaned in such an order, polluting substances chemically adhered to the surface 101 of a filter membrane or into the pores 102 of the membrane that comes into contact with filtered water 103 can be efficiently removed while reducing the amounts of the oxidizing agents and water to be used. As a result, a filter membrane capable of maintaining its filtration performance for a long period of time can be obtained.

On the other hand, when a filter membrane is cleaned by using only cleaning water that contains a $2^{nd}$ oxidizing agent with high oxidizability, oxidative degradation and removal of both easily-degradable organic matter and refractory organic matter are possible. However, since the reaction efficiency between the $2^{nd}$ oxidizing agent and the refractory organic matter is low, efficient oxidative degradation and removal of the refractory organic matter from the filter membrane are difficult. In addition, a large amount of cleaning water containing the $2^{nd}$ oxidizing agent must be used in order to perform sufficient oxidative degradation and removal of the refractory organic matter, resulting in increased amounts of the $2^{nd}$ oxidizing agent and water to be used herein.

Furthermore, when a filter membrane is cleaned by using cleaning water that contains a $2^{nd}$ oxidizing agent with high oxidizability and then cleaned by using cleaning water that contains a $1^{st}$ oxidizing agent with low oxidizability, refractory organic matter may not be removed from the filter membrane since the 1st oxidizing agent with low oxidizability is unable to oxidatively degrade the refractory organic matter. Therefore, in a manner similar to that in the case of cleaning a filter membrane using only cleaning water that contains a $2^{nd}$ oxidizing agent with high oxidizability, a large amount of cleaning water containing the $2^{nd}$ oxidizing agent must be used in order to sufficiently degrade oxidatively the refractory organic matter for removal, resulting in increased amounts of the $2^{nd}$ oxidizing agent and water to be used herein.

Furthermore, when a filter membrane is cleaned by using cleaning water that contains both a $1^{st}$ oxidizing agent with low oxidizability and a $2^{nd}$ oxidizing agent with high oxi- dizability, both easily degradable organic matter and refractory organic matter can be removed by oxidative degradation. However, the oxidizing agents react to each other, and therefore the consumption of the oxidizing agents increases, and the easily degradable organic matter and the refractory organic matter alone cannot be selectively accelerated.

The $1^{st}$ oxidizing agent and $2^{nd}$ oxidizing agent are not particularly limited, as long as these agents are substances capable of oxidatively degrading organic matter, and substances known in the art can be used. Examples of the $1^{st}$ oxidizing agent and the $2^{nd}$ oxidizing agent include sodium hypochlorite, hydrogen peroxide, caustic soda, and ozone. In particular, the $1^{st}$ oxidizing agent has a standard oxidation-reduction potential (25° C.) of preferably less than 2.0V as measured with a hydrogen electrode, and the $2^{nd}$ oxidizing agent has a standard oxidation-reduction potential (25° C.) of preferably 2.0V or higher as measured with a hydrogen electrode. Specifically, sodium hypochlorite is preferably used as the $1^{st}$ oxidizing agent, and ozone is preferably used as the $2^{nd}$ oxidizing agent. The use of such a combination of oxidizing agents enables even more efficient removal of polluting substances chemically adhered to the surface 101 of a filter membrane or into the pores 102 of the membrane that comes into contact with filtered water 103.

The concentration of the $1^{st}$ oxidizing agent in cleaning water is not particularly limited, and is preferably 0.05 mg/L or more and 10000 mg/L or less, and is more preferably 0.5 mg/L or more and 8000 mg/L or less. Also, the concentration of the $2^{nd}$ oxidizing agent in cleaning water is not particularly limited and is preferably 0.01 mg/L or more and 1000 mg/L or less, and is more preferably 0.1 mg/L or more and 800 mg/L or less. If the concentration of the $1^{st}$ oxidizing agent or the $2^{nd}$ oxidizing agent is lower than the above ranges, polluting substances chemically adhered to the surface 101 of a filter membrane or into the pores 102 of the membrane that comes into contact with filtered water 103 may not be efficiently removed via oxidative degradation. On the other hand, if the concentration of the $1^{st}$ oxidizing agent or the $2^{nd}$ oxidizing agent is higher than the above ranges, the consumption of the oxidizing agent is increased, and thus the treatment costs may be increased. Furthermore, when ozone is particularly used as the $2^{nd}$ oxidizing agent, and the concentration of ozone is too high, the filter membrane can be deteriorated.

Water for the cleaning water is not particularly limited, as long as it is clear water. Tap water, pure water, RO water, deionized water, and the like can be used herein, and filtered water 103 resulting from filtration treatment with a filter membrane is preferably used. Filtered water 103 that has been filtered with a filter membrane is used so that introduction of water from outside is not required and the costs required for cleaning can be reduced.

The amounts of cleaning water containing the $1^{st}$ oxidizing agent and cleaning water containing the $2^{nd}$ oxidizing agent to be supplied to a filter membrane can be adequately set depending on the amount of polluting substances chemically adhered to the surface 101 of a filter membrane or into the pores 102 of the membrane that comes into contact with filtered water 103, and are not particularly limited. In general, the total amount of cleaning water containing the $1^{st}$ oxidizing agent and cleaning water containing the $2^{nd}$ oxidizing agent is preferably $\frac{1}{1000}$ or more and $\frac{1}{10}$ or less the amount of filtered water obtained after passage through the filter membrane. When the total amount of cleaning water is less than $\frac{1}{1000}$ the amount of filtered water, polluting substances chemically adhered to the surface 101 of a filter membrane or into the pores 102 of the membrane that comes into contact with filtered water 103 may not be sufficiently removed. On the other hand, when the total amount of cleaning water is higher than 1/10 the amount of filtered water, the amounts of oxidizing agents and water to be used herein are increased, which may result in increased treatment costs.

The volume ratio of cleaning water containing the $1^{st}$ oxidizing agent to cleaning water containing the $2^{nd}$ oxidizing agent may be adequately adjusted depending on the concentration of each oxidizing agent in cleaning water and is not particularly limited, but generally ranges from 5:95 to 95:5, and preferably ranges from 10:90 to 90:10. For example, when the concentration of the $1^{st}$ oxidizing agent in cleaning water is 0.05 mg/L or more and less than 1000 mg/L, the volume ratio of cleaning water containing the $1^{st}$ oxidizing agent to cleaning water containing the $2^{nd}$ oxidizing agent preferably ranges from 50:50 to 90:10. Also, when the concentration of the $1^{st}$ oxidizing agent in cleaning water is 1000 mg/L or more and 10000 mg/L or less, the volume ratio of cleaning water containing the $1^{st}$ oxidizing agent to cleaning water containing the $2^{nd}$ oxidizing agent preferably ranges from 10:90 to 50:50.

The volume ratio of each cleaning water within the above range makes it possible to efficiently remove polluting substances composed of easily degradable organic matter and refractory organic matter via oxidative degradation. If the amount of cleaning water containing the $1^{st}$ oxidizing agent is too low, the effect of lowering the adhesion of the refractory organic matter to the filter membrane and the effect of altering the refractory organic matter are not sufficiently exhibited from cleaning water containing the $1^{st}$ oxidizing agent, and thus the refractory organic matter may not be efficiently removed. On the other hand, if the amount of cleaning water containing the $2^{nd}$ oxidizing agent is too low, the cleaning effect is not sufficiently exhibited by cleaning water containing the $2^{nd}$ oxidizing agent, and thus the refractory organic matter may not be removed. Furthermore, the amount of cleaning water containing the $1^{st}$ oxidizing agent is increased, so that the amounts of the oxidizing agents and water to be used herein are increased, which may result in increased treatment costs.

In particular, when ozone is used as the $2^{nd}$ oxidizing agent, transmembrane pressure that is the pressure difference between the upstream side and the downstream side of a filter membrane upon cleaning treatment is proportional to the product of the concentration of ozone in cleaning water and the time for cleaning. Specifically, when transmembrane pressure is denoted with x (kPa), and the product of the concentration of ozone and the time for cleaning is denoted with y (mg/L·minutes), a relational expression of $y=\alpha x$ is established, wherein $\alpha$ is a variable parameter that is preferably 10 or more and 1000 or less in view of the efficiency of the removal of polluting substances. Transmembrane pressure is measured upon cleaning treatment, so that the optimum ozone concentration and the optimum cleaning time for the cleaning treatment can be determined. Hence, polluting substances chemically adhered to the surface 101 of a filter membrane or into the pores 102 of the membrane that comes into contact with filtered water 103 can be removed even more efficiently while reducing the amount of cleaning water containing ozone.

The cleaning time with each type of cleaning water is not particularly limited, may be adequately set depending on the amount of polluting substances adhered to a filter membrane, and is not particularly limited. In general, the time for cleaning may be 30 seconds or more and 60 minutes or less. If the time for cleaning is less than 30 seconds, the removal of polluting substances may be insufficient. On the other hand, if the cleaning time exceeds 60 minutes, the amounts of oxidizing agents and water to be used therein are increased, which may result in increased treatment costs.

Furthermore, the interval between cleaning with cleaning water containing the $1^{st}$ oxidizing agent and cleaning with cleaning water containing the $2^{nd}$ oxidizing agent is not particularly limited. However, if the interval is too long, the effect of removing polluting substances may not be sufficiently obtained. Therefore, the interval is preferably 30 seconds or more and 10 minutes or less.

Furthermore, a filter membrane may be cleaned using cleaning water that contains no oxidizing agent between cleaning of the filter membrane using cleaning water that contains the $1^{st}$ oxidizing agent and cleaning of the filter membrane using cleaning water that contains the $2^{nd}$ oxidizing agent. Cleaning of a filter membrane using cleaning water that contains no oxidizing agent can prevent a reaction from taking place between the $1^{st}$ oxidizing agent and the $2^{nd}$ oxidizing agent, so that the effect resulting from the cleaning of the filter membrane using cleaning water containing the $2^{nd}$ oxidizing agent can be stably obtained.

Furthermore, before cleaning of a filter membrane using cleaning water that contains the $1^{st}$ oxidizing agent, between cleaning of a filter membrane using cleaning water that contains the $1^{st}$ oxidizing agent and cleaning of the filter membrane using cleaning water that contains the $2^{nd}$ oxidizing agent, or after cleaning of a filter membrane using cleaning water that contains the $2^{nd}$ oxidizing agent, the filter membrane may be cleaned using cleaning water that contains acid. Accordingly, scale-forming metals such as calcium, magnesium, silica, and aluminium adhered to the surface 101 of a filter membrane or into the pores 102 of the membrane that comes into contact with filtered water 103 can be removed. In addition, acid to be used therein has no effect of oxidatively degrading organic matter, unlike oxidizing agents.

In particular, when ozone is used as the $2^{nd}$ oxidizing agent, cleaning water containing the $2^{nd}$ oxidizing agent preferably contains acid. Specifically, after cleaning of a filter membrane using cleaning water containing the $1^{st}$ oxidizing agent, the filter membrane is preferably cleaned using ozone- or acid-containing cleaning water with a pH of 5 or less. Since such cleaning can increase the concentration of ozone in cleaning water, metal and polluting substances chemically adhered to the surface 101 of a filter membrane or into the pores 102 of the membrane that comes into contact with filtered water 103 can be removed even more efficiently.

Acid is not particularly limited, and any acid known in the art can be used herein. As examples of acid, inorganic acids such as hydrochloric acid, sulfuric acid, and nitric acid, and organic acids such as oxalic acid and citric acid can be used. These acids can be used independently or 2 or more types thereof can be used in combination.

After cleaning using acid-containing cleaning water, the filter membrane is preferably cleaned using cleaning water containing no oxidizing agent in order to remove any acid remaining in the filter membrane.

Embodiment 2

An apparatus for cleaning a filter membrane according to this embodiment comprises a means for cleaning a filter membrane using at least 2 types of cleaning water containing oxidizing agents, and is characterized by cleaning a filter membrane using cleaning water in an ascending order of the oxidizabilities of the oxidizing agents.

Hereinafter, an apparatus for cleaning a filter membrane, which comprises a means for cleaning a filter membrane using 2 types of cleaning water, is described in detail as an example. However, it goes without saying that such an apparatus can be an apparatus for cleaning a filter membrane, which comprises a means for cleaning a filter membrane with 3 or more types of cleaning water.

The apparatus for cleaning a filter membrane according to the embodiment is characterized by comprising a means for cleaning a filter membrane using cleaning water containing the $1^{st}$ oxidizing agent, and a means for cleaning the filter membrane using cleaning water containing the $2^{nd}$ oxidizing agent with oxidizability higher than that of the $1^{st}$ oxidizing agent.

Hereafter, a preferred embodiment of the apparatus for cleaning a filter membrane according to the embodiment is explained with reference to the drawings.

Figure 3:
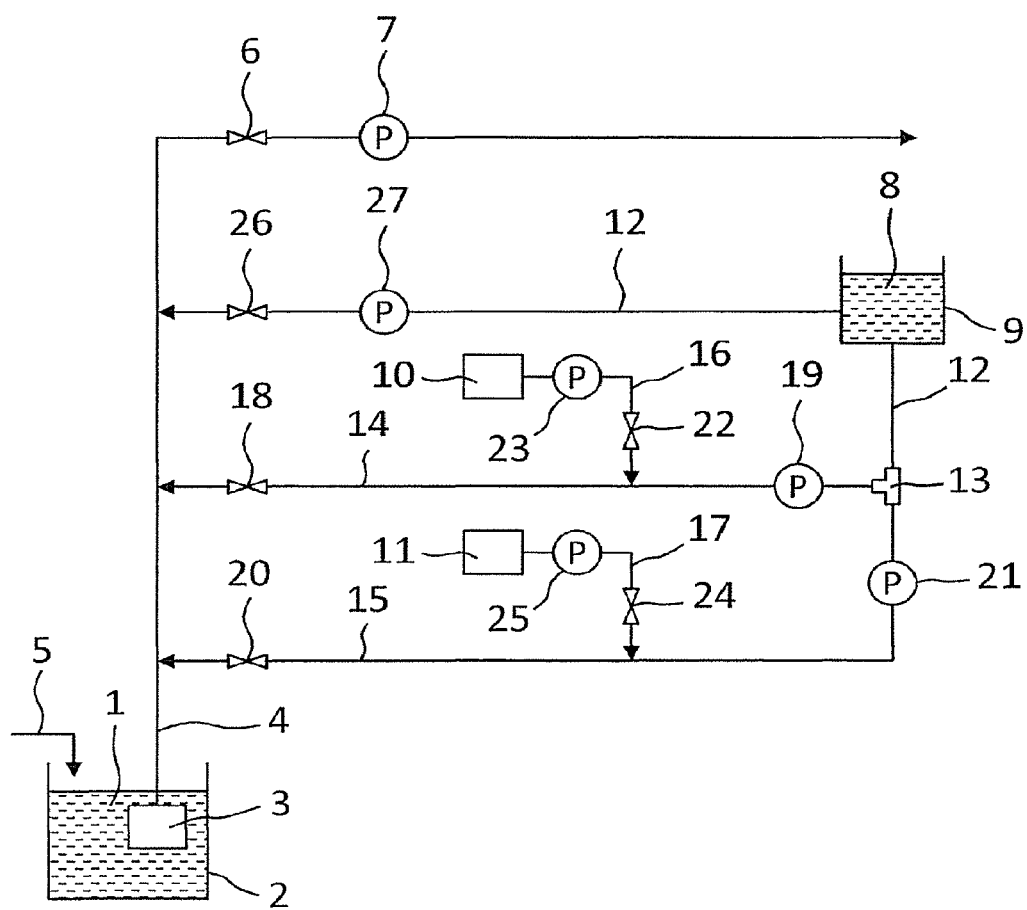
FIG. 3 is a conceptual diagram showing a water treatment system comprising an apparatus for cleaning a filter membrane according to Embodiment 2.

FIG. 3 is a conceptual diagram showing a water treatment system comprising an apparatus for cleaning a filter membrane according to the embodiment.

In FIG. 3, the water treatment system comprises a filtration device having a water tank 2 for containing water to be treated 1, a membrane module 3 having a filter membrane for filtering water to be treated 1, and a filtered water piping 4 for discharging water filtered in the membrane module 3. The water tank 2 for water to be treated is provided with a water supply piping 5 for supplying water to be treated 1, and the filtered water piping 4 is provided with a filtration valve 6 and a filtration pump 7. When water to be treated 1 is filtered in the filtration device, the filtration valve 6 is opened to activate the filtration pump 7, so that water to be treated 1 is filtered in the membrane module 3. Filtered water filtered in the membrane module 3 is then discharged via the filtered water piping 4. When water to be treated 1 is continuously filtered in the membrane module 3, the filter membrane in the membrane module 3 becomes fouled with polluting substances. Hence, the filter membrane should be cleaned.

Accordingly, the water treatment system further comprises an apparatus for cleaning a filter membrane. The apparatus for cleaning a filter membrane comprises a means for cleaning a filter membrane using cleaning water containing a $1^{st}$ oxidizing agent, and a means for cleaning the filter membrane using cleaning water containing a $2^{nd}$ oxidizing agent with oxidizability higher than that of the $1^{st}$ oxidizing agent.

Specifically, as shown in FIG. 3, the apparatus for cleaning a filter membrane comprises a cleaning water tank 9 for containing cleaning water 8, a $1^{st}$ oxidizing agent storage tank 10 for containing the $1^{st}$ oxidizing agent, and a $2^{nd}$ oxidizing agent storage tank 11 for storing a $2^{nd}$ oxidizing agent. The cleaning water tank 9 is provided with two lines of cleaning water piping 12, wherein one of the lines of the cleaning water piping 12 is branched into a $1^{st}$ backwash piping 14 and a $2^{nd}$ backwash piping 15 at a switching valve 13, and the other cleaning water piping 12 is connected to the filtered water piping 4. The $1^{st}$ oxidizing agent storage tank 10 is provided with a $1^{st}$ oxidizing agent supply piping 16, wherein the $1^{st}$ oxidizing agent supply piping 16 is connected to the $1^{st}$ backwash piping 14. The $2^{nd}$ oxidizing agent storage tank 11 is provided with a $2^{nd}$ oxidizing agent supply piping 17, wherein the $2^{nd}$ oxidizing agent supply piping 17 is connected to the $2^{nd}$ backwash piping 15. The $1^{st}$ backwash piping 14 is provided with a $1^{st}$ backwash valve 18 and a $1^{st}$ backwash pump 19, and the $2^{nd}$ backwash piping 15 is provided with a $2^{nd}$ backwash valve 20 and a $2^{nd}$ backwash pump 21. The $1^{st}$ oxidizing agent supply piping 16 is provided with a $1^{st}$ oxidizing agent supply valve 22 and a $1^{st}$ oxidizing agent supply pump 23, and the $2^{nd}$ oxidizing agent supply piping 17 is provided with a $2^{nd}$ oxidizing agent supply valve 24 and a $2^{nd}$ oxidizing agent supply pump 25. The other cleaning water piping 12 is provided with a cleaning water supply valve 26 and a cleaning water supply pump 27. In addition, although not shown in the figures, all pumps and valves, and the switching valve 13, are connected to a control device, and the control device controls the operation of all pumps and valves, and the switching valve 13.

When a filter membrane is cleaned by using an apparatus for cleaning a filter membrane, which has the above configuration, first, the filtration pump 7 is stopped to close the filtration valve 6, and then cleaning treatment for the filter membrane is started. The switch from filtration of water to be treated 1 to cleaning of the filter membrane may be set depending on the time for filtration treatment.

After completion of filtration treatment but before the start of cleaning treatment for the filter membrane, the filter membrane in the membrane module 3 may be preliminarily treated. For example, the filter membrane in the membrane module 3 is exposed to air for a predetermined time period, so as to be able to facilitate the removal of polluting substances adhered to the surface 100 of the filter membrane that comes into contact with water to be treated 1. Alternatively, the cleaning water supply valve 26 is opened to activate the cleaning water supply pump 27, cleaning water 8 is supplied from the cleaning water tank 9 to the membrane module 3 via the cleaning water piping 12 and the filtered water piping 4, and then the filter membrane may be preliminarily cleaned. When preliminary cleaning is performed, the removal of polluting substances adhered to the surface 100 of the filter membrane that comes into contact with water to be treated 1 can also be similarly facilitated.

During cleaning treatment for a filter membrane, first, the $1^{st}$ backwash valve 18 is opened to activate the $1^{st}$ backwash pump 19, cleaning water 8 is supplied from the cleaning water tank 9 to the $1^{st}$ backwash piping 14 via the cleaning water piping 12 and the switching valve 13, the $1^{st}$ oxidizing agent supply valve 22 is opened to activate the $1^{st}$ oxidizing agent supply pump 23, and then the $1^{st}$ oxidizing agent is supplied from the $1^{st}$ oxidizing agent storage tank 10 to the $1^{st}$ backwash piping 14 via the $1^{st}$ oxidizing agent supply piping 16. Therefore, the cleaning water 8 and the $1^{st}$ oxidizing agent are mixed within the $1^{st}$ backwash piping 14. In addition, although not shown in the figures, the $1^{st}$ backwash piping 14 may be provided with a means (for example, a static mixer) for uniformly mixing the cleaning water 8 and the $1^{st}$ oxidizing agent. Subsequently, the cleaning water 8 containing the $1^{st}$ oxidizing agent is supplied to the membrane module 3 via the filtered water piping 4, and then the filter membrane is cleaned by backflow cleaning in the membrane module 3. Alternatively, the $1^{st}$ backwash piping 14 is provided with a tank for containing the cleaning water 8, the $1^{st}$ oxidizing agent is supplied into the tank, the cleaning water 8 and the $1^{st}$ oxidizing agent are mixed uniformly, the mixed water is pumped to the membrane module 3, and then backflow cleaning may be performed for the filter membrane in the membrane module 3. The backflow cleaning of the filter membrane in the membrane module 3 using the cleaning water 8 containing the $1^{st}$ oxidizing agent can remove easily degradable organic matter via oxidative reduction from among polluting substances adhered to the filter membrane, and can chemically act on refractory organic matter so as to lower the adhesion of the refractory organic matter to the filter membrane and to alter the refractory organic matter.

Cleaning water 8 containing the $1^{st}$ oxidizing agent, which is discharged from the membrane module 3 after backflow cleaning, is discharged into the water tank 2 for water to be treated, and can be used as water to be treated 1 for filtration treatment. Alternatively, cleaning water 8 containing the $1^{st}$ oxidizing agent, which is discharged from the membrane module 3 after backflow cleaning, may be separately recovered as a solution used for treatment and then treated. In addition, after each backwash treatment described below, cleaning solution 8 can also be treated in a manner similar to the above.

Next, after closing the $1^{st}$ backwash valve 18, the cleaning water supply valve 26 is opened to activate the cleaning water supply pump 27, and then cleaning water 8 is supplied from the cleaning water tank 9 to the membrane module 3 via the cleaning water piping 12 and the filtered water piping 4, thereby cleaning a filter membrane by backflow cleaning in the membrane module 3. In addition, the backflow cleaning of the filter membrane using cleaning water 8 in the membrane module 3 is not essential. However, since this backflow cleaning can prevent a reaction from taking place between the $1^{st}$ oxidizing agent and the $2^{nd}$ oxidizing agent, an effect exerted by the backflow cleaning of the filter membrane using cleaning water 8 containing the $2^{nd}$ oxidizing agent can be stably obtained.

Next, after the cleaning water supply valve 26 is closed, the $2^{nd}$ backwash valve 20 is opened to activate the $2^{nd}$ backwash pump 21, and then cleaning water 8 is supplied from the cleaning water tank 9 to the $2^{nd}$ backwash piping 15 via the cleaning water piping 12 and the switching valve 13, as well as the $2^{nd}$ oxidizing agent supply valve 24 is opened to activate the $2^{nd}$ oxidizing agent supply pump 25, and then the $2^{nd}$ oxidizing agent is supplied from the $2^{nd}$ oxidizing agent storage tank 11 to the $2^{nd}$ backwash piping 15 via the $2^{nd}$ oxidizing agent supply piping 17. Accordingly, the cleaning water 8 and the $2^{nd}$ oxidizing agent are mixed within the $2^{nd}$ backwash piping 15. In addition, although not shown in the figures, the $2^{nd}$ backwash piping 15 may be provided with a means (for example, a static mixer) for uniformly mixing the cleaning water 8 with the $2^{nd}$ oxidizing agent. The cleaning water 8 containing the $2^{nd}$ oxidizing agent is then supplied to the membrane module 3 via the filtered water piping 4, thereby performing backflow cleaning of a filter membrane in the membrane module 3. Alternatively, the $2^{nd}$ backwash piping 15 is provided with a tank for containing cleaning water 8, the $2^{nd}$ oxidizing agent is supplied into the tank, so as to uniformly mix the cleaning water 8 with $2^{nd}$ oxidizing agent, and then the mixed water may be pumped into the membrane module 3 so as to clean the filter membrane by backflow cleaning in the membrane module 3. Through backflow cleaning of the filter membrane in the membrane module 3 using the cleaning water 8 containing the $2^{nd}$ oxidizing agent, refractory organic matter can be removed via oxidative degradation.

In addition, regarding the apparatus for cleaning a filter membrane of the embodiment, the use of 2 types of cleaning solution containing oxidizing agents is explained. However, when 3 or more types of cleaning solution containing oxidizing agents are used, an oxidizing agent storage tank is additionally used and then cleaning treatment may be performed in the similar manner.

When cleaning treatment using the apparatus for cleaning a filter membrane is completed, the $2^{nd}$ backwash valve 20 is closed and then water to be treated 1 is filtered again, so that filtration treatment of water to be treated 1 can be continuously and efficiently performed.

With the use of the apparatus for cleaning a filter membrane having the above-mentioned configuration, not only polluting substances adhered to the surface 100 of a filter membrane that comes into contact with water to be treated 1, but also polluting substances chemically adhered to the surface 101 of a filter membrane or into the pores 102 of the membrane that comes into contact with filtered water 103 can be efficiently removed while reducing the amounts of oxidizing agents and water to be used, and the filtration performance can be maintained for a long period of time.

Embodiment 3

Figure 4:
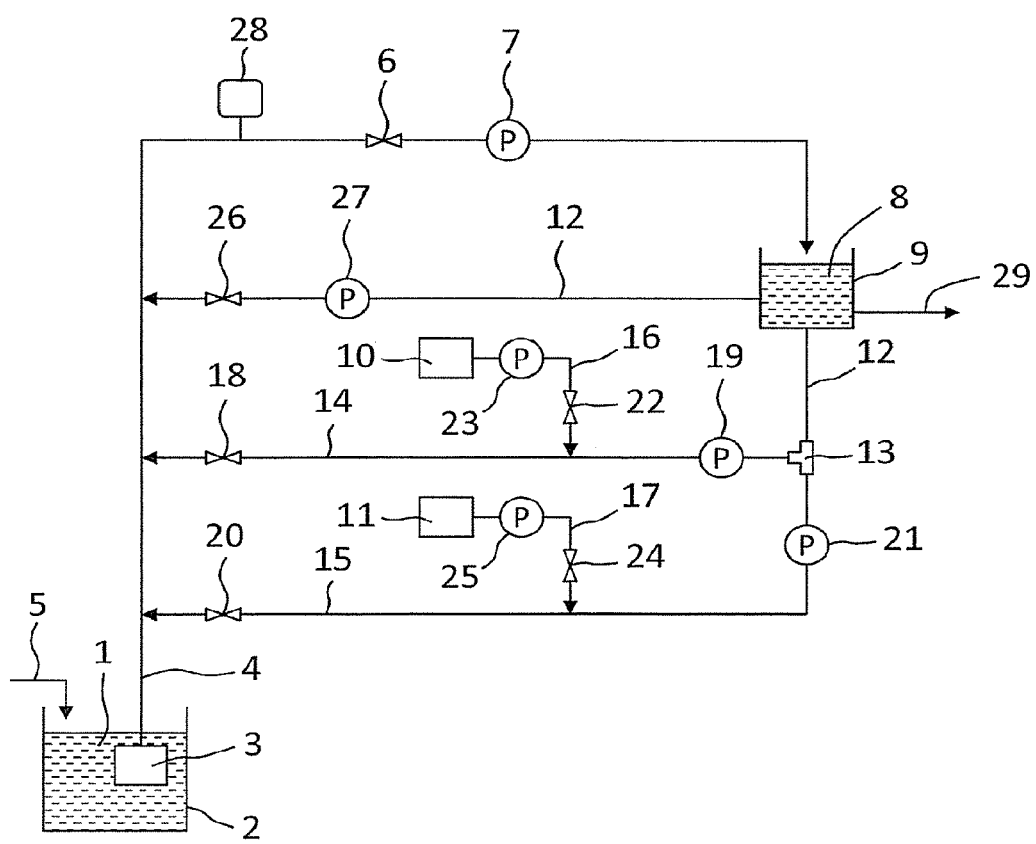
FIG. 4 is a conceptual diagram showing a water treatment system comprising an apparatus for cleaning a filter membrane according to Embodiment 3.

FIG. 4 is a conceptual diagram showing a water treatment system comprising an apparatus for cleaning a filter membrane according to this embodiment. In addition, the basic configuration of a water treatment system comprising an apparatus for cleaning a filter membrane according to the embodiment is the same as that of the water treatment system comprising an apparatus for cleaning a filter membrane according to Embodiment 2. Hence, only the differences between the two are explained. In addition, configurations similar to those of the water treatment system comprising an apparatus for cleaning a filter membrane according to Embodiment 2 are described with the same symbols.

In FIG. 4, the water treatment system comprising an apparatus for cleaning a filter membrane according to the embodiment differs from the water treatment system comprising an apparatus for cleaning a filter membrane according to Embodiment 2 in that a pressure gauge 28 is further connected to the filtered water piping 4, a filtrate discharge piping 29 is further connected to the cleaning water tank 9, and filtered water 103 to be discharged from the filtered water piping 4 is supplied to the cleaning water tank 9.

In a water treatment system having such a structure, filtered water 103 that is obtained by filtration treatment of water to be treated 1 is used as cleaning water 8. Excess filtered water 103 that is not used as cleaning water 8 is discharged to the outside through the filtrate discharge piping 29. Filtered water 103 is used as cleaning water 8, so that the introduction of cleaning water 8 from outside is not required, and the costs required for backflow cleaning can be reduced.

Moreover, the water treatment system has the filtered water piping 4 provided with the pressure gauge 28, and thus the transmembrane pressure of the filter membrane upon filtration treatment can be calculated. The term "transmembrane pressure" as used herein refers to a pressure difference between the upstream side and the downstream side of the filter membrane upon filtration treatment. Specifically, the pressure gauge 28 installed in the filtered water piping 4 can measure the pressure on the downstream side of the filter membrane upon filtration treatment, so that transmembrane pressure can be calculated from the difference with the pressure (normal pressure) on the upstream side of the filter membrane upon filtration treatment. The pressure gauge 28 is always monitored upon filtration treatment for water to be treated 1, so as to control the system such that filtration treatment for water to be treated 1 is completed when the pressure reaches a predetermined pressure level, and then the cleaning treatment for the filter membrane is started. In this manner, filtration treatment for water to be treated 1 and cleaning treatment for the filter membrane can be switched to each other automatically.

Embodiment 4

Figure 5:
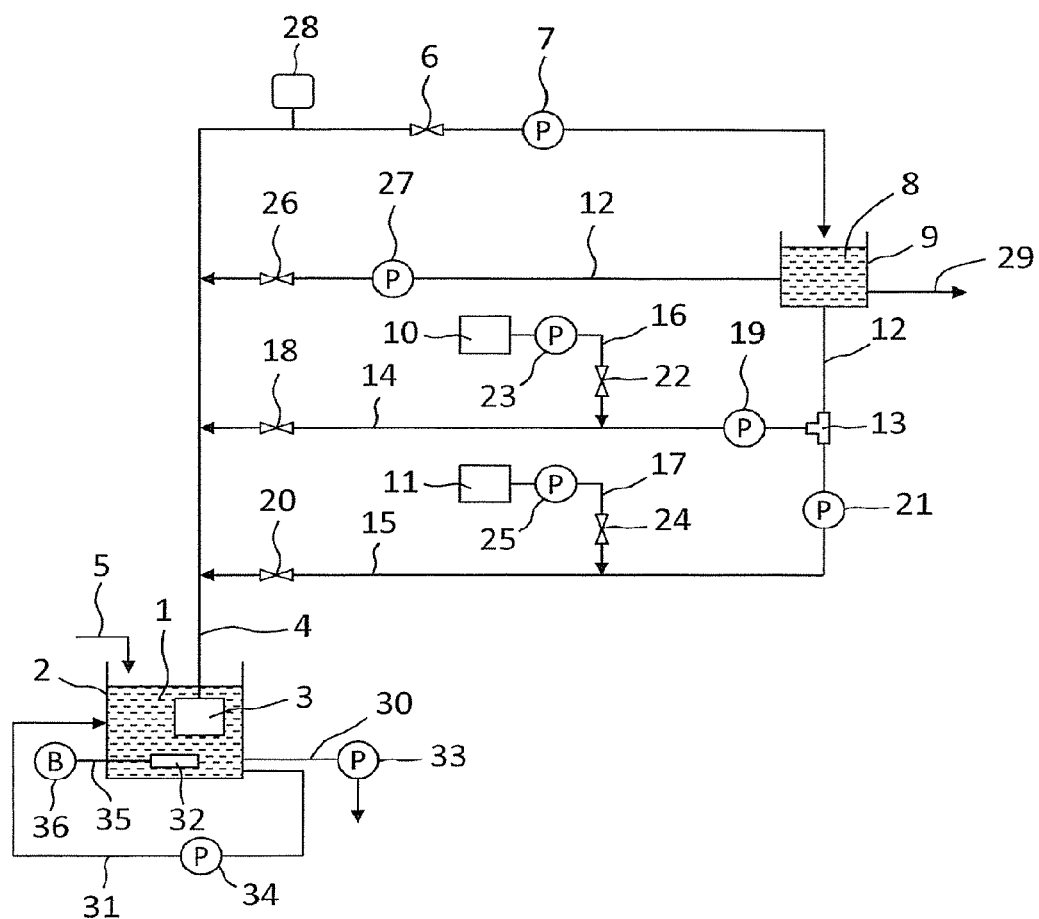
FIG. 5 is a conceptual diagram showing a water treatment system comprising an apparatus for cleaning a filter membrane according to Embodiment 4.

FIG. 5 is a conceptual diagram showing a water treatment system comprising an apparatus for cleaning a filter membrane according to this embodiment. In addition, the basic configuration of a water treatment system comprising an apparatus for cleaning a filter membrane according to the embodiment is the same as that of the water treatment system comprising an apparatus for cleaning a filter membrane according to Embodiment 3. Hence, only the differences between the two are explained. In addition, configurations similar to those of the water treatment system comprising an apparatus for cleaning a filter membrane according to Embodiment 3 are described with the same symbols.

In FIG. 5, the water treatment system comprising an apparatus for cleaning a filter membrane according to the embodiment has an apparatus (membrane bioreactor processing unit) for treating water to be treated 1 such as the water of sewerage and industrial waste water via membrane bioreactor (MBR) processes. Specifically, a water treatment system comprising an apparatus for cleaning a filter membrane according to the embodiment differs from the water treatment system comprising an apparatus for cleaning a filter membrane according to Embodiment 3 in that a sludge drawing piping 30 and a sludge circulation piping 31 are further connected to the water tank 2 for water to be treated, and an air diffuser 32 is disposed on the bottom of the water tank 2 for water to be treated. Furthermore, the sludge drawing piping 30 is provided with a sludge drawing pump 33 for drawing out sludge, and the sludge circulation piping 31 is provided with a sludge circulation pump 34 for circulation of sludge within the water tank 2 for water to be treated. Moreover, a blower 36 is connected to the air diffuser 32 via an air supply piping 35.

The water treatment system having such a structure involves filling the water tank 2 for water to be treated with activated sludge having MLSS (mixed liquor suspended solids) concentration of 3000-20000 mg/L. When water to be treated 1 such as the water of sewerage and industrial waste water is supplied into the water tank 2 for water to be treated, biological treatment is performed by the activated sludge within the water tank 2 for water to be treated and then the resultant is separated into treated water (filtered water 103) and activated sludge by filtration treatment in the membrane module 3. The sludge circulation pump 34 is activated to circulate the activated sludge within the water tank 2 for water to be treated via the sludge circulation piping 31, so that the activated sludge can be brought into contact efficiently with the water to be treated 1. The activated sludge increased by the biological treatment with the activated sludge is discharged from the sludge drawing pump 33 by the activation of the sludge drawing pump 33, so as to control the MLSS concentration at a constant level. Moreover, air is supplied from the air diffuser 32 connected to the blower 36 via the air supply piping 35 to the activated sludge within the water tank 2 for water to be treated. Accordingly, biological treatment by the activated sludge is accelerated and the flow of the water to be treated 1 enables stable filtration treatment to be performed in the membrane module 3.

When filtration treatment is performed as described above, the filter membrane in the membrane module 3 is fouled with activated sludge. However, a water treatment system comprising an apparatus for cleaning a filter membrane according to the embodiment can efficiently remove not only polluting substances adhered to the surface 100 of a filter membrane that comes into contact with water to be treated 1, but also activated sludge chemically adhered to the surface 101 of a filter membrane or into the pores 102 of the membrane that comes into contact with filtered water 103 while reducing the amounts of oxidizing agents and water to be used, so as to be able to maintain the filtration performance for a long period of time. Therefore the use of the water treatment system comprising an apparatus for cleaning a filter membrane according to the embodiment enables efficient treatment by the membrane bioreactor (MBR) processes.

In addition, the above embodiment illustrates a case in which the membrane module 3 is immersed in one water tank 2 for water to be treated. The water tank 2 for water to be treated may be divided into 2 or more portions and the membrane module 3 may be immersed in the downstream-side water tank 2 for water to be treated. Furthermore, a membrane module 3 installed in a case is provided outside the water tank 2 for water to be treated, filtration treatment may be performed while circulating activated sludge between the membrane module 3 installed in the case and the water tank 2 for water to be treated. In any case, configurations known in the art can be employed without inhibiting the effect of the invention.

Embodiment 5

Figure 6:
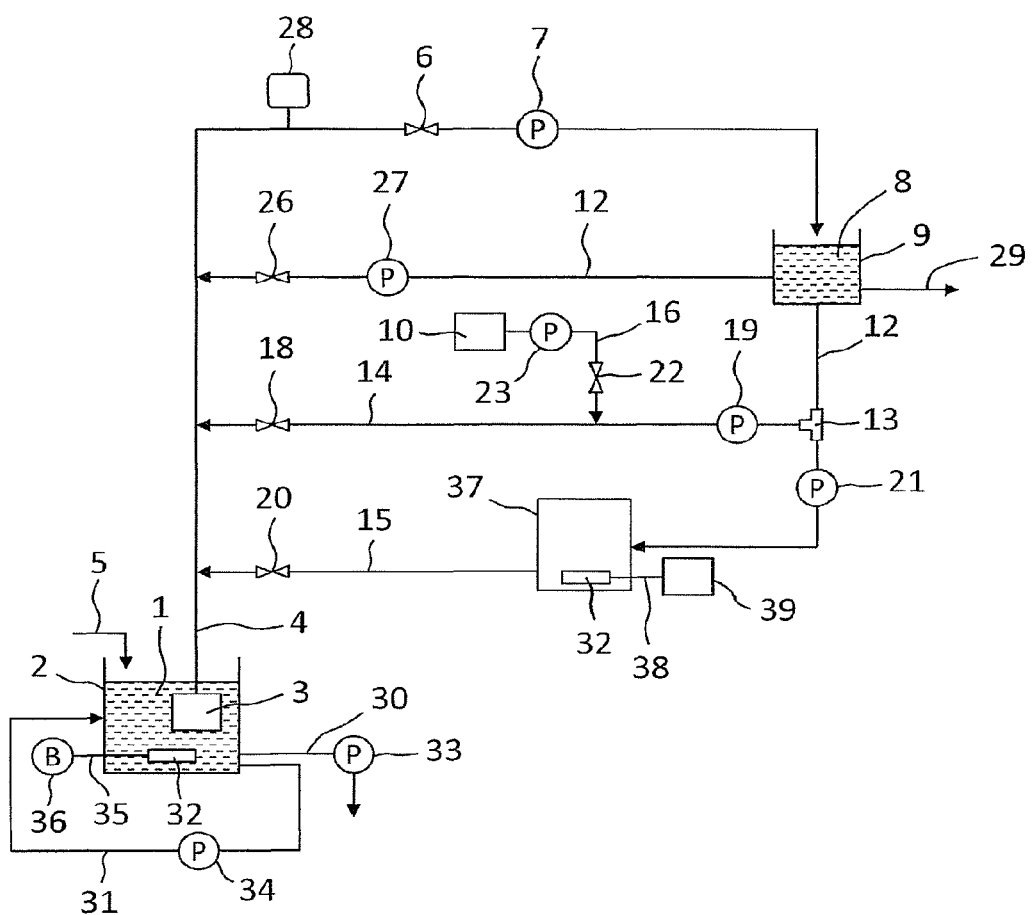
FIG. 6 is a conceptual diagram showing a water treatment system comprising an apparatus for cleaning a filter membrane according to Embodiment 5.

FIG. 6 is a conceptual diagram showing a water treatment system comprising an apparatus for cleaning a filter membrane according to this embodiment. In addition, the basic configuration of the water treatment system comprising an apparatus for cleaning a filter membrane according to the embodiment is the same as that of the water treatment system comprising an apparatus for cleaning a filter membrane according to Embodiment 4. Hence, only the differences between the two are explained. In addition, configurations similar to those of the water treatment system comprising an apparatus for cleaning a filter membrane according to Embodiment 4 are described with the same symbols.

In FIG. 6, a water treatment system comprising an apparatus for cleaning a filter membrane according to the embodiment has a structure appropriate for a case in which ozone is used as the $2^{nd}$ oxidizing agent. Specifically, the water treatment system comprising an apparatus for cleaning a filter membrane according to the embodiment differs from the water treatment system comprising an apparatus for cleaning a filter membrane according to Embodiment 4 in that a tower for generating ozonated water 37 is connected to one of the lines of the cleaning water piping 12 branched at the switching valve 13. The air diffuser 32 is disposed on the bottom of the tower for generating ozonated water 37, and an ozone generator 39 is connected to the air diffuser 32 via an ozone supply piping 38. The ozone raw material to be supplied to the ozone generator 39 is not particularly limited, and liquid oxygen or oxygen generated by PSA (Pressure Swing Adsorption) or PVSA (Pressure Vacuum Swing Adsorption) can be used.

The water treatment system having such a structure involves, upon backflow cleaning using ozone ($2^{nd}$ oxidizing agent)-containing cleaning water 8, opening the $2^{nd}$ backwash valve 20, supplying cleaning water 8 from the cleaning water tank 9 to the tower for generating ozonated water 37 via the cleaning water piping 12 and the switching valve 13, and supplying ozone gas generated by the ozone generator 39 from the air diffuser 32 via the ozone supply piping 38, thereby generating ozonated water within the tower for generating ozonated water 37. Ozonated water generated within the tower for generating ozonated water 37 is then supplied to the membrane module 3 via the $2^{nd}$ backwash piping 15 and the filtered water piping 4, thereby cleaning the filter membrane by backflow cleaning in the membrane module 3. The tower for generating ozonated water 37 is provided as described above, so that ozonated water can be efficiently generated. Moreover, after backflow cleaning, ozonated water remaining within the membrane module 3 is self-decomposed, so that filtration treatment can be immediately started thereafter.

In addition, FIG. 6 illustrates a case in which the air diffuser 32 is used as an ozone gas supply means. However, such an apparatus may be any apparatus capable of generating ozonated water by bringing ozone gas into contact with cleaning water 8 and is not particularly limited. For example, an ozone gas supply means of an ejector type, a mechanical agitation type, a downward injection type, or the like can be used.

Embodiment 6

Figure 7:
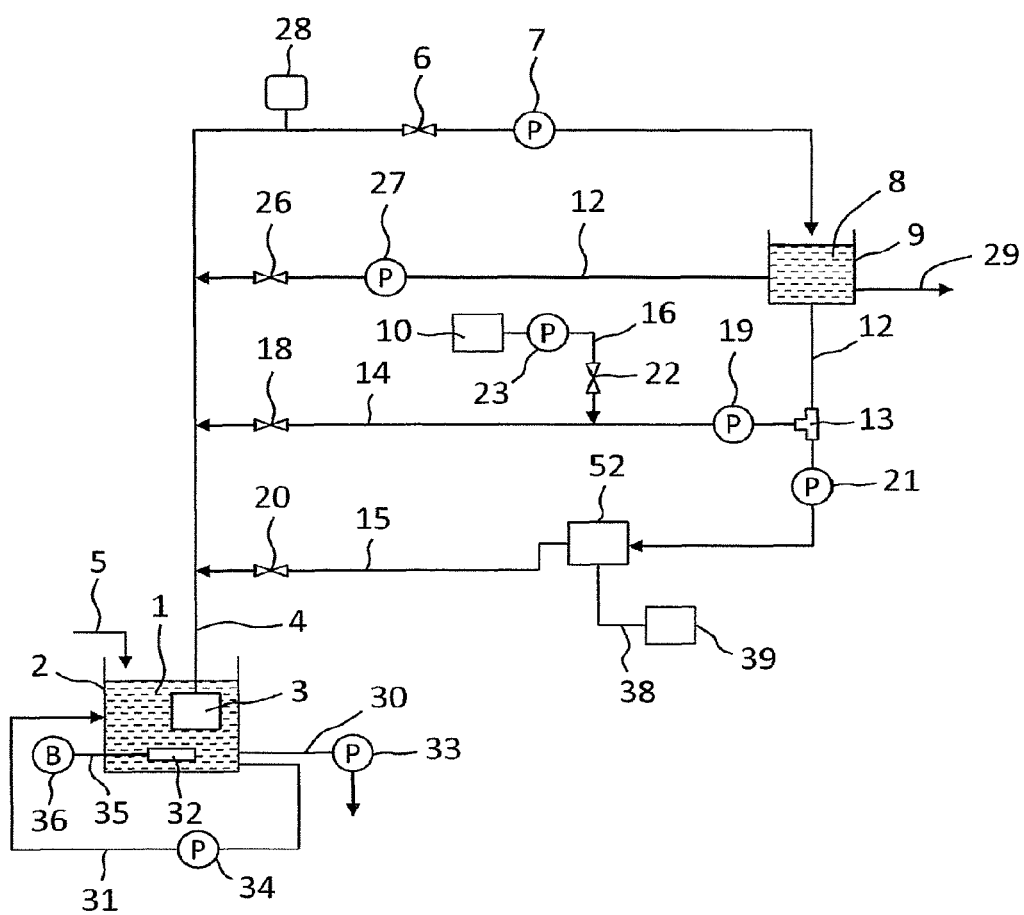
FIG. 7 is a conceptual diagram showing a water treatment system comprising an apparatus for cleaning a filter membrane according to Embodiment 6.

FIG. 7 is a conceptual diagram showing a water treatment system comprising an apparatus for cleaning a filter membrane according to this embodiment. In addition, the basic configuration of the water treatment system comprising an apparatus for cleaning a filter membrane according to the embodiment is the same as that of the water treatment system comprising an apparatus for cleaning a filter membrane according to Embodiment 5. Hence, only the differences between the two are explained. In addition, configurations similar to those of the water treatment system comprising an apparatus for cleaning a filter membrane according to Embodiment 5 are described with the same symbols.

In FIG. 7, the water treatment system comprising an apparatus for cleaning a filter membrane according to the embodiment differs from the water treatment system comprising an apparatus for cleaning a filter membrane according to Embodiment 5 in that an ejector 52 is provided instead of the air diffuser 32 and the tower for generating ozonated water 37. The ejector 52 is connected to one of the lines of the cleaning water piping 12 branched at the switching valve 13.

The water treatment system having such a structure involves, upon backflow cleaning using ozone ($2^{nd}$ oxidizing agent)-containing cleaning water 8, opening the $2^{nd}$ backwash valve 20, supplying the cleaning water 8 from the cleaning water tank 9 to the ejector 52 via the cleaning water piping 12 and the switching valve 13, as well as supplying ozone gas generated by the ozone generator 39 to the ejector 52 via the ozone supply piping 38, thereby generating ozonated water within the ejector 52. Ozonated water generated within the ejector 52 is then supplied to the membrane module 3 via the $2^{nd}$ backwash piping 15 and the filtered water piping 4, thereby cleaning a filter membrane by backflow cleaning in the membrane module 3. Ozonated water can be efficiently generated by providing the ejector 52 in this manner.

Embodiment 7

Figure 8:
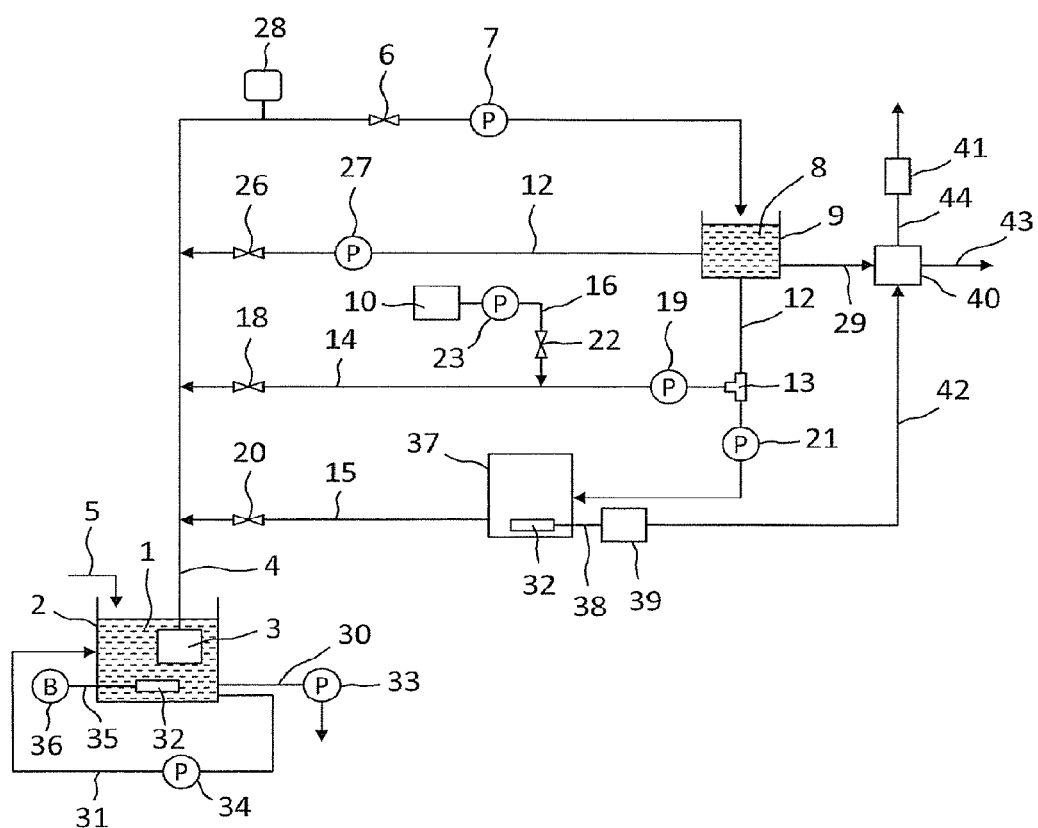
FIG. 8 is a conceptual diagram showing a water treatment system comprising an apparatus for cleaning a filter membrane according to Embodiment 7.

FIG. 8 is a conceptual diagram showing a water treatment system comprising an apparatus for cleaning a filter membrane according to this embodiment. In addition, the basic configuration of the water treatment system comprising an apparatus for cleaning a filter membrane according to the embodiment is the same as that of the water treatment system comprising an apparatus for cleaning a filter membrane according to Embodiment 5. Hence, only the differences between the two are explained. Moreover, configurations similar to those of the water treatment system comprising an apparatus for cleaning a filter membrane according to Embodiment 5 are described with the same symbols.

In FIG. 8, the water treatment system comprising an apparatus for cleaning a filter membrane according to the embodiment differs from the water treatment system comprising an apparatus for cleaning a filter membrane according to Embodiment 5 in that the system further comprises an ozone reactor 40 and a waste ozone treatment facility 41. The ozone reactor 40 is connected to the cleaning water tank 9 via the filtrate discharge piping 29 and also connected to the ozone generator 39 via the ozone supply piping 42. Moreover, the ozone reactor 40 is provided with an ozonated water piping 43 for discharging ozonated cleaning water 8 (filtered water 103). The waste ozone treatment facility 41 is connected to the ozone reactor 40 via a waste ozone piping 44.

The water treatment system having such a structure involves supplying filtered water 103 (cleaning water 8) within the cleaning water tank 9 to an ozone reactor 40 via the filtrate discharge piping 29, as well as supplying ozone gas generated by the ozone generator 39 to the ozone reactor 40 via the ozone supply piping 42, thereby ozonating filtered water 103. This can lower the chromaticity and the turbidity of the filtered water 103, and can remove organic matter, inorganic matter (e.g., iron and manganese), viruses and the like contained in the filtered water 103 by oxidative degradation, so that the water quality of the filtered water 103 can be improved. Unreacted ozone gas not used for ozonation is supplied to the waste ozone treatment facility 41 via the waste ozone piping 44, degraded to oxygen at the waste ozone treatment facility 41, and then released into air.

Embodiment 8

Figure 9:
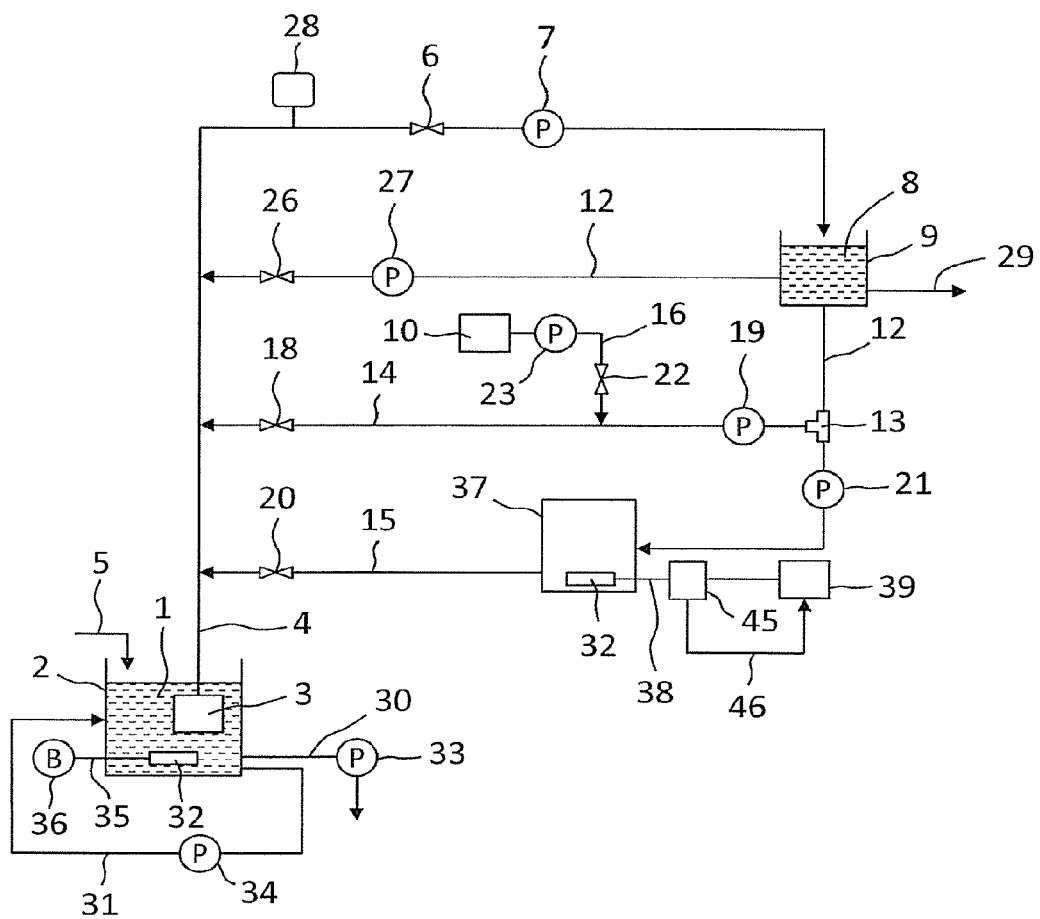
FIG. 9 is a conceptual diagram showing a water treatment system comprising an apparatus for cleaning a filter membrane according to Embodiment 8.

FIG. 9 is a conceptual diagram showing a water treatment system comprising an apparatus for cleaning a filter membrane according to this embodiment. In addition, the basic configuration of the water treatment system comprising an apparatus for cleaning a filter membrane according to the embodiment is the same as that of the water treatment system comprising an apparatus for cleaning a filter membrane according to Embodiment 5. Hence, only the differences between the two are explained. In addition, configurations similar to those of the water treatment system comprising an apparatus for cleaning a filter membrane according to Embodiment 5 are described with the same symbols.

In FIG. 9, the water treatment system comprising an apparatus for cleaning a filter membrane according to the embodiment differs from the water treatment system comprising an apparatus for cleaning a filter membrane according to Embodiment 5 in that the ozone supply piping 38 between the ozone generator 39 and the tower for generating ozonated water 37, more specifically between the air diffuser 32 and the ozone generator 39, is further provided with an ozone gas storage tank 45. An oxygen gas return piping 46 is connected to the ozone gas storage tank 45, so that oxygen gas contained in the ozone gas is returned to the ozone generator 39 via the oxygen gas return piping 46, and then reused as a raw material for ozone gas. The ozone gas storage tank 45 contains a material that can adsorb ozone gas. As a material that can adsorb ozone gas, an adsorbent such as silica gel can be used without particular limitation.

The water treatment system having such a structure involves supplying ozone gas from the ozone generator 39 to the ozone gas storage tank 45 at a low temperature, so that an adsorbent can adsorb ozone gas within the ozone gas storage tank 45. Ozone gas can then be supplied from the ozone gas storage tank 45 to the air diffuser 32 by aspirating ozone gas adsorbed in advance to the adsorbent within the ozone gas storage tank 45 using a pump, an injector (not shown in the figures) or the like provided between the ozone gas storage tank 45 and the air diffuser 32. Ozone gas is adsorbed in advance to an adsorbent in the ozone gas storage tank 45, so that high-concentration ozone gas can be supplied to the air diffuser 32. Therefore, high-concentration ozonated water can be generated in the tower for generating ozonated water 37, as well as the amount of ozone gas to be used herein can be reduced to increase the dissolution efficiency of the ozone gas. Moreover, ozone gas can be stored in the ozone gas storage tank 45, so that a small-sized ozone generator 39 with low production of ozone can be used.

Furthermore, in the water treatment system comprising an apparatus for cleaning a filter membrane according to the embodiment, in view of stably obtaining the above effect, high-purity oxygen containing nitrogen or the like at a level as low as possible is preferably used as a raw material to be used in the ozone generator 39. For example, oxygen gas subjected to vaporization of liquid nitrogen is preferably used. Furthermore, when ozone gas is supplied to the air diffuser 32, gas at an early stage of aspiration can contain an abundance of oxygen gas. Hence, such gas at an early stage of aspiration is preferably returned to the ozone generator 39 via the oxygen gas return piping 46. Through such control, high-concentration ozone gas can be stably supplied to the air diffuser 32. The concentration of ozone gas to be supplied to the air diffuser 32 is not particularly limited and preferably ranges from 25 to 100 wt %.

Embodiment 9

Figure 10:
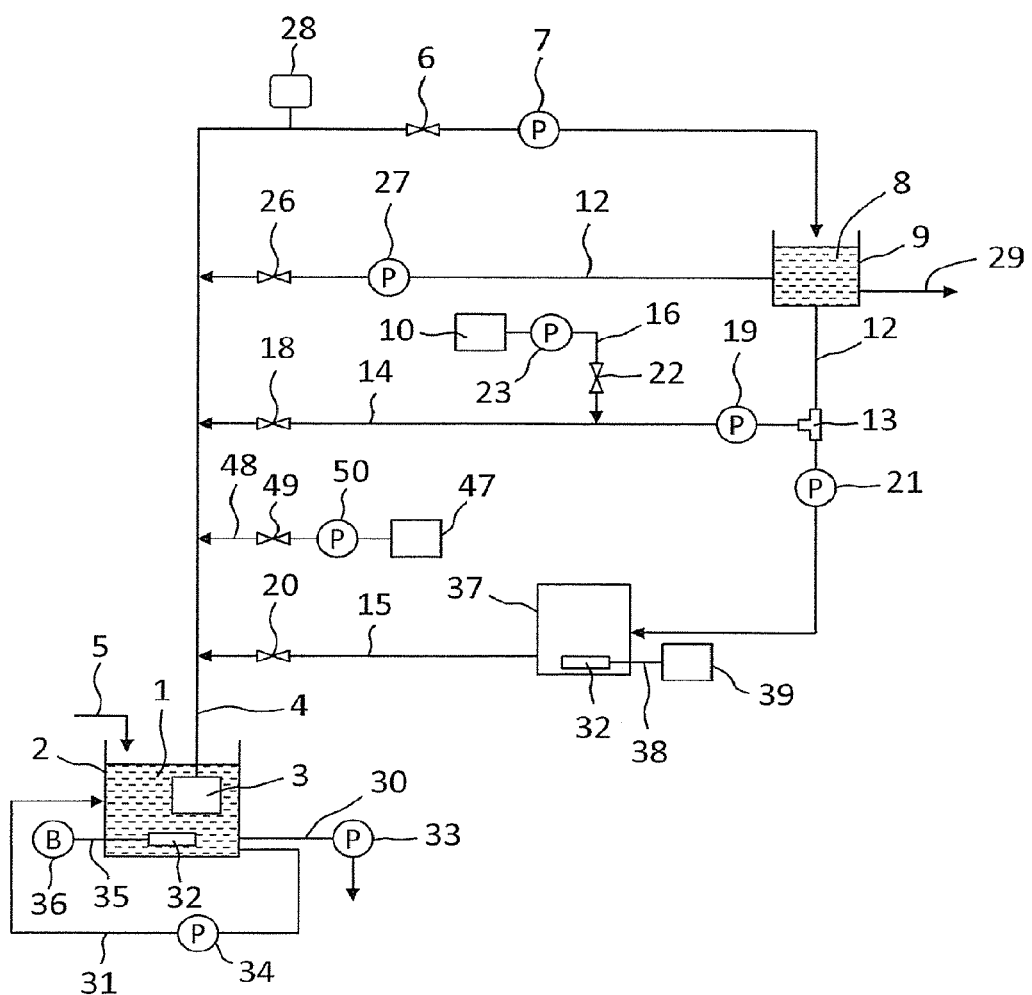
FIG. 10 is a conceptual diagram showing a water treatment system comprising an apparatus for cleaning a filter membrane according to Embodiment 9.

FIG. 10 is a conceptual diagram showing a water treatment system comprising an apparatus for cleaning a filter membrane according to this embodiment. In addition the basic configuration of a water treatment system comprising an apparatus for cleaning a filter membrane according to this embodiment is the same as that of the water treatment system comprising an apparatus for cleaning a filter membrane according to Embodiment 5. Hence, only the differences between the two are explained. In addition, configurations similar to those of the water treatment system comprising an apparatus for cleaning a filter membrane according to Embodiment 5 are described with the same symbols.

In FIG. 10, the water treatment system comprising an apparatus for cleaning a filter membrane according to the embodiment differs from the water treatment system comprising an apparatus for cleaning a filter membrane according to Embodiment 5 in that an acid storage tank 47 is further provided. The acid storage tank 47 is provided with an acid supply piping 48, and the acid supply piping 48 is connected to the filtered water piping 4. Moreover, the acid supply piping 48 is provided with an acid supply valve 49 and an acid supply pump 50.

The water treatment system having such a structure involves, before backflow cleaning using cleaning water 8 containing the $1^{st}$ oxidizing agent, or after backflow cleaning using cleaning water 8 containing the $2^{nd}$ oxidizing agent, opening the acid supply valve 49 to activate the acid supply pump 50, and then supplying acid from the acid storage tank 47 to the filtered water piping 4 via the acid supply piping 48. Simultaneously with these steps, the cleaning water supply valve 26 is opened to activate the cleaning water supply pump 27, and then the cleaning water 8 is supplied from the cleaning water tank 9 to the filtered water piping 4 via the cleaning water piping 12, thereby mixing acid and the cleaning water 8 within the filtered water piping 4. The thus obtained acid-containing cleaning water 8 is supplied to the membrane module 3, followed by backflow cleaning of the filter membrane in the membrane module 3. Backflow cleaning with the acid-containing cleaning water 8 is performed, so that scale-forming metals such as calcium, magnesium, silica, and aluminium adhered to the filter membrane in the membrane module 3 can be removed.

Embodiment 10

Figure 11:
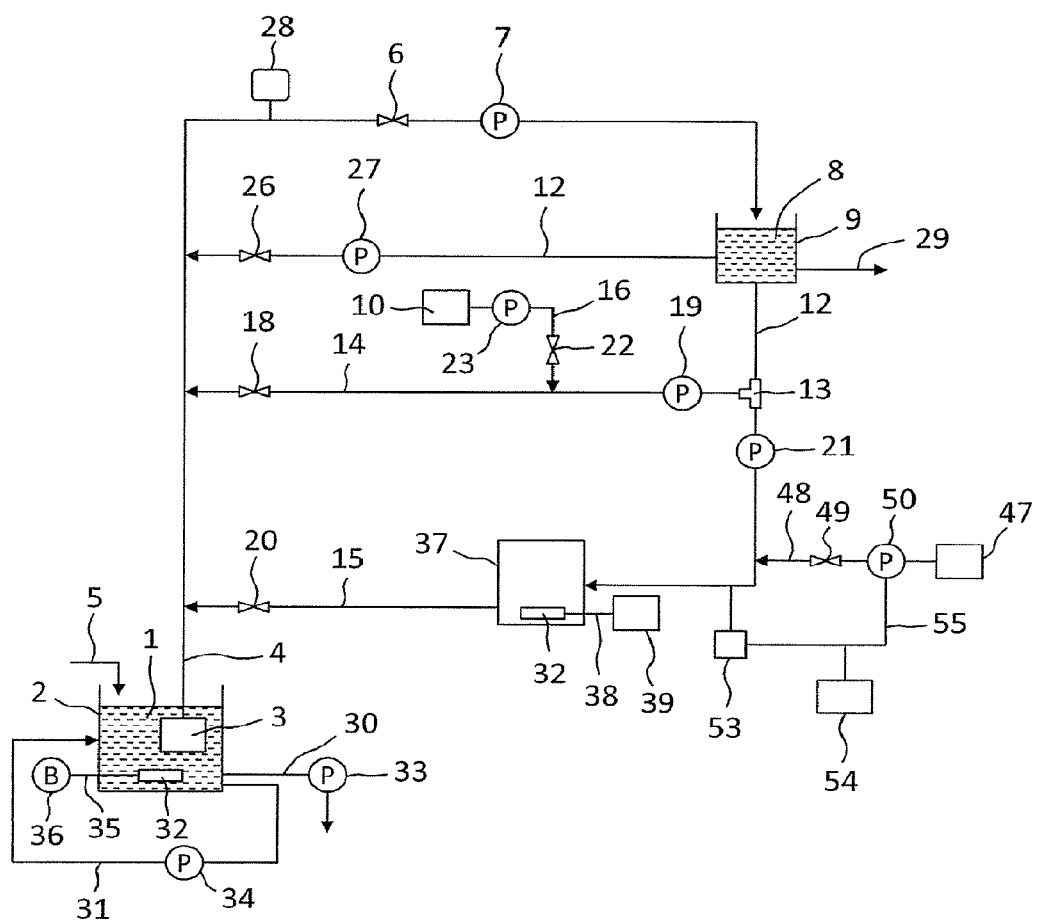
FIG. 11 is a conceptual diagram showing a water treatment system comprising an apparatus for cleaning a filter membrane according to Embodiment 10.

FIG. 11 is a conceptual diagram showing a water treatment system comprising an apparatus for cleaning a filter membrane according to this embodiment. In addition, the basic configuration of the water treatment system comprising an apparatus for cleaning a filter membrane according to this embodiment is the same as that of the water treatment system comprising an apparatus for cleaning a filter membrane according to Embodiment 9. Hence, only the differences between the two are explained. In addition, configurations similar to those of the water treatment system comprising an apparatus for cleaning a filter membrane according to Embodiment 9 are described with the same symbols.

In FIG. 11, the water treatment system comprising the apparatus for cleaning a filter membrane according to the embodiment differs from the water treatment system comprising an apparatus for cleaning a filter membrane according to Embodiment 9 in that the acid storage tank 47 is connected to one of the lines of the cleaning water piping 12 branched at the switching valve 13 via the acid supply piping 48, and a pH meter 53 and a control device 54 for controlling the acid supply pump 50 depending on the pH of the cleaning water 8 as measured by the pH meter 53 are further provided. The control device 54 is connected to the acid supply pump 50 and the pH meter 53 using a signal wire 55. Furthermore, the acid supply piping 48 is provided with the acid supply valve 49 and the acid supply pump 50.

The water treatment system having such a structure involves, after backflow cleaning using the cleaning water 8 containing the $1^{st}$ oxidizing agent, opening the acid supply valve 49 to activate the acid supply pump 50, and then supplying acid from the acid storage tank 47 to the cleaning water piping 12 via the acid supply piping 48. Simultaneously with these steps, the $2^{nd}$ backwash valve 20 is opened to activate the $2^{nd}$ backwash pump 21, and then the cleaning water 8 is supplied from the cleaning water tank 9 to the tower for generating ozonated water 37 via the cleaning water piping 12 and the switching valve 13, thereby mixing acid with the cleaning water 8 within the cleaning water piping 12. At this time, the acid supply pump 50 is controlled by the control device 54 depending on the pH of the cleaning water 8 as measured by the pH meter 53, so that the amount of acid to be supplied to the cleaning water piping 12 can be adjusted. Ozone gas generated by the ozone generator 39 is supplied from the air diffuser 32 to the thus obtained acid-cleaning water 8 via the ozone supply piping 38, thereby generating acid-containing ozonated water within the tower for generating ozonated water 37. The acid-containing ozonated water generated within the tower for generating ozonated water 37 is then supplied to the membrane module 3 via the $2^{nd}$ backwash piping 15 and the filtered water piping 4, thereby cleaning the filter membrane by backflow cleaning in the membrane module 3. Ozone gas is supplied to the acid-containing cleaning water 8 in this manner, so that the ozone concentration in the cleaning water 8 can be increased. Accordingly, through backflow cleaning using acid-containing ozonated water, metal and polluting substances chemically adhered to the surface 101 of the filter membrane or into the pores 102 of the membrane that comes into contact with the filtered water 103 in the membrane module 3 can be removed even more efficiently.

The pH of the cleaning water 8 to be measured by the pH meter 53 is not particularly limited, and is preferably 5 or less, more preferably 2 or more and 5 or less, and further preferably 3 or more and 4 or less. When the pH exceeds 5, an effect of increasing the concentration of ozone cannot be sufficiently obtained. On the other hand, when the pH is less than 2, the activity of activated sludge within the water tank 2 for water to be treated decreases, and the water quality of filtered water 103 obtained by filtration treatment can be lowered.

EXAMPLES

Hereafter, the present invention is specifically explained referring to Examples and Comparative examples, but is not limited to the following Examples and Comparative examples.

Example 1

With the use of the water treatment system in FIG. 6 comprising an apparatus for cleaning a filter membrane, water to be treated 1 was filtered and a filter membrane was cleaned. As the filter membrane, a PVDF hollow fiber membrane having an average pore diameter of 0.1 μm was used (the same filter membrane was used in the following Examples and Comparative examples).

First, membrane bioreactor treatment was performed for water to be treated 1 under the conditions below.
  Temperature of water to be treated 1: 30° C.
  Capacity of water tank 2 for water to be treated: 32 L
  Hydraulic retention time (HRT): 6 hours
  Quantity of flow of water to be treated 1: 128 L/day
  MLSS concentration: 9000 mg/L
  BOD-SS load: 0.05-0.08 kg BOD/kgSS/day
  Quantity of aeration: 10 L/min
  Area of filter membrane: 0.1 m²
  Filtration period (intermittent operation): Time for filtration treatment 12 min/stop time 3 min Next, membrane bioreactor treatment was stopped when the transmembrane pressure exceeded 40 kPa, followed by backflow cleaning of the filter membrane. In backflow cleaning, sodium hypochlorite was used as the $1^{st}$ oxidizing agent and ozone was used as the $2^{nd}$ oxidizing agent. The filter membrane was cleaned by backflow cleaning using cleaning water 8 containing sodium hypochlorite, and then the filter membrane was cleaned by backflow cleaning using cleaning water 8 containing ozone. Here, the concentration of sodium hypochlorite in the cleaning water 8 containing sodium hypochlorite was 5000 mg/L, the concentration of ozone in the cleaning water 8 containing ozone was 18 mg/L, and the volume ratio of the sodium hypochlorite-containing cleaning water 8 to the ozone-containing cleaning water 8 was 20:80.

Comparative Example 1

Figure 12:
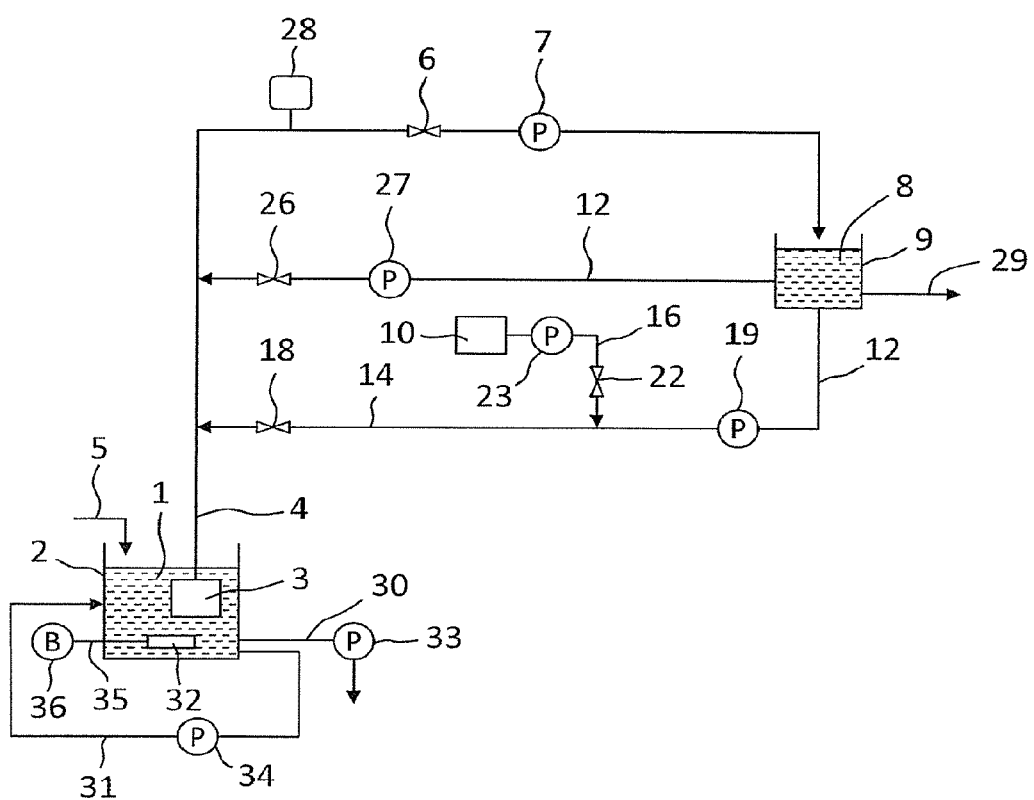
FIG. 12 is a conceptual diagram showing a water treatment system comprising an apparatus for cleaning a filter membrane used in Comparative Example 1.

With the use of the water treatment system in FIG. 12 comprising an apparatus for cleaning a filter membrane, water to be treated 1 was filtered and a filter membrane was cleaned. The water treatment system in FIG. 12 comprising an apparatus for cleaning a filter membrane is the same as the water treatment system in FIG. 7 comprising an apparatus for cleaning a filter membrane except that the system in FIG. 12 has no means for backflow cleaning using cleaning water 8 containing the $2^{nd}$ oxidizing agent (ozone).

First, membrane bioreactor treatment was performed for water to be treated 1 under the same conditions as those in Example 1.

Next, membrane bioreactor treatment was stopped when the transmembrane pressure exceeded 40 kPa, followed by backflow cleaning of the filter membrane. The filter membrane was cleaned by backflow cleaning using sodium hypochlorite as the $1^{st}$ oxidizing agent. Specifically, the filter membrane was cleaned by backflow cleaning using cleaning water 8 containing sodium hypochlorite. Here, the concentration of sodium hypochlorite in the cleaning water 8 containing sodium hypochlorite was 5000 mg/L.

Comparative Example 2

Figure 13:
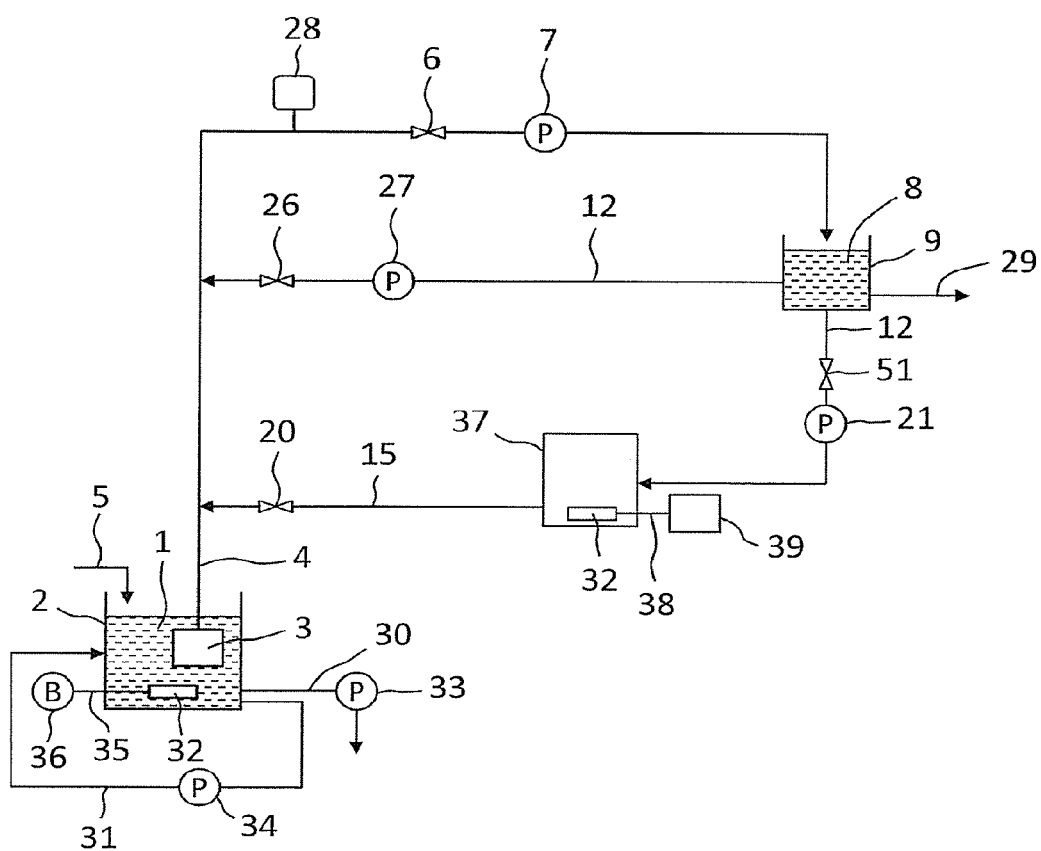
FIG. 13 is a conceptual diagram showing a water treatment system comprising an apparatus for cleaning a filter membrane used in Comparative Example 2.

With the use of the water treatment system in FIG. 13 comprising an apparatus for cleaning a filter membrane, water to be treated 1 was filtered and a filter membrane was cleaned. The water treatment system in FIG. 13 comprising an apparatus for cleaning a filter membrane is basically the same as the water treatment system in FIG. 7 comprising an apparatus for cleaning a filter membrane, except that the system in FIG. 13 has no means for backflow cleaning with cleaning water 8 containing the $1^{st}$ oxidizing agent (sodium hypochlorite). In addition, in the water treatment system in FIG. 13 comprising an apparatus for cleaning a filter membrane, the cleaning water piping 12 was provided with a cleaning water supply valve 51 in order to control the amount of cleaning water 8 to be supplied to the tower for generating ozonated water 37.

First, membrane bioreactor treatment was performed for water to be treated 1 under the same conditions as those in Example 1.

Next, membrane bioreactor treatment was stopped when the transmembrane pressure exceeded 40 kPa, followed by backflow cleaning of the filter membrane. In backflow cleaning, ozone was used as the $2^{nd}$ oxidizing agent. The filter membrane was cleaned by backflow cleaning with cleaning water 8 containing ozone. Here, the concentration of ozone in the ozone-containing cleaning water 8 was 18 mg/L.

Comparative Example 3

With the water treatment system in FIG. 6 comprising an apparatus for cleaning a filter membrane, water to be treated 1 was filtered and a filter membrane was cleaned.

First, membrane bioreactor treatment was performed for water to be treated 1 under the same conditions as those in Example 1.

Next, membrane bioreactor treatment was stopped when the transmembrane pressure exceeded 40 kPa, followed by backflow cleaning of a filter membrane. In backflow cleaning, sodium hypochlorite was used as the 1$^{st}$ oxidizing agent and ozone was used as the 2$^{nd}$ oxidizing agent. Specifically, the filter membrane was cleaned by backflow cleaning using the ozone-containing cleaning water 8, and then the filter membrane was cleaned by backflow cleaning using cleaning water 8 containing sodium hypochlorite. Here, the concentration of sodium hypochlorite in the sodium hypochlorite-containing cleaning water 8 was 5000 mg/L, the concentration of ozone in the ozone-containing cleaning water 8 was 18 mg/L, and the volume ratio of the sodium hypochlorite-containing cleaning water 8 to the ozone-containing cleaning water 8 was 20:80.

Comparative Example 4

Figure 14:
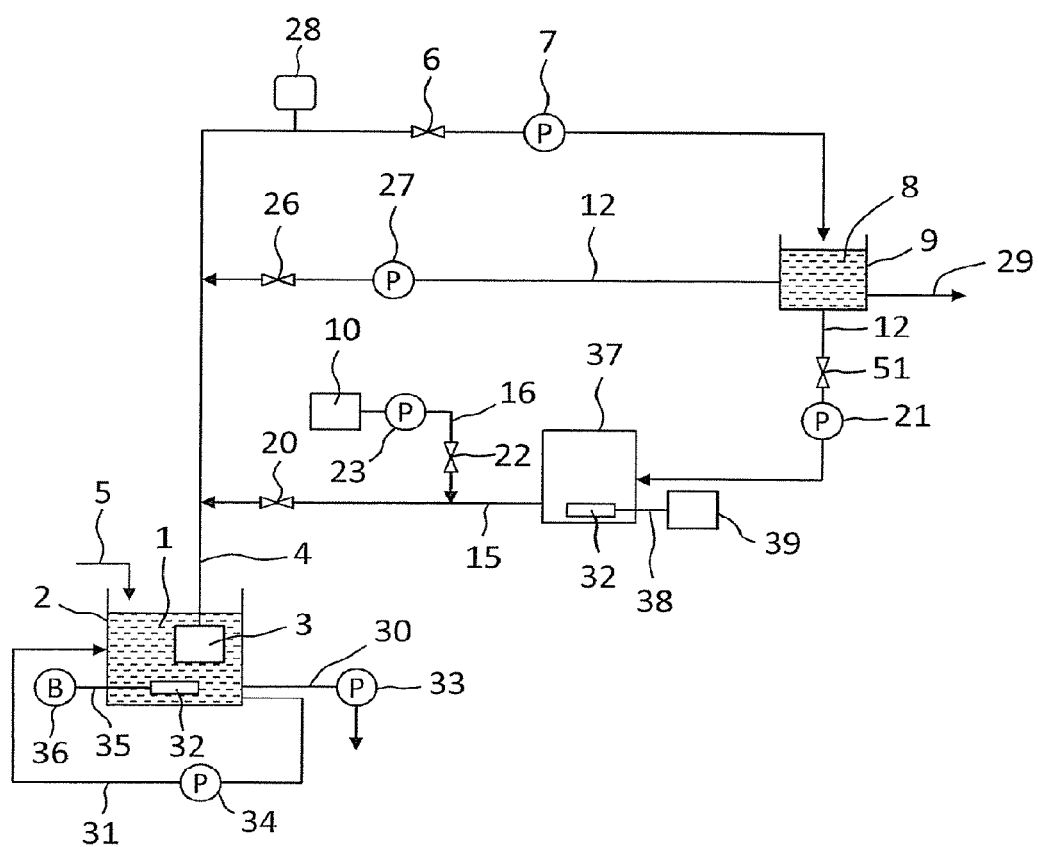
FIG. 14 is a conceptual diagram showing a water treatment system comprising an apparatus for cleaning a filter membrane used in Comparative Example 4.

With the use of the water treatment system in FIG. 14 comprising an apparatus for cleaning a filter membrane, water to be treated 1 was filtered and a filter membrane was cleaned. The water treatment system in FIG. 14 comprising an apparatus for cleaning a filter membrane has a configuration, wherein in the water treatment system in FIG. 13 comprising an apparatus for cleaning a filter membrane, the 1$^{st}$ oxidizing agent storage tank 10 is connected to the 2$^{nd}$ backwash piping 15 via the 1$^{st}$ oxidizing agent supply piping 16, so that backflow cleaning can be performed using cleaning water 8 containing both the 1$^{st}$ oxidizing agent and the 2$^{nd}$ oxidizing agent.

First, membrane bioreactor treatment was performed for water to be treated 1 under the same conditions as those in Example 1.

Next, membrane bioreactor treatment was stopped when the transmembrane pressure exceeded 40 kPa, followed by backflow cleaning of the filter membrane. In backflow cleaning, sodium hypochlorite used as the 1$^{st}$ oxidizing agent and ozone was used as the 2$^{nd}$ oxidizing agent. Specifically, the filter membrane was cleaned by backflow cleaning using cleaning water 8 containing both sodium hypochlorite and ozone. Here, the mixing ratio of sodium hypochlorite to ozone was the volume ratio of 50:50, and the concentration of sodium hypochlorite and the concentration of ozone in the cleaning water 8 were 5000 mg/L and 18 mg/L, respectively.

The relationship between the amounts of the cleaning water 8 used for backflow cleaning in Example 1 and Comparative Examples 1-4 and the recovery rate of transmembrane pressure were evaluated. The results are shown in FIG. 15.

In addition, the recovery rate of transmembrane pressure was calculated with the following formula.

Recovery (%) of transmembrane pressure=transmembrane pressure after backflow cleaning/transmembrane pressure before backflow cleaning (after filtration treatment)×100

Figure 15:
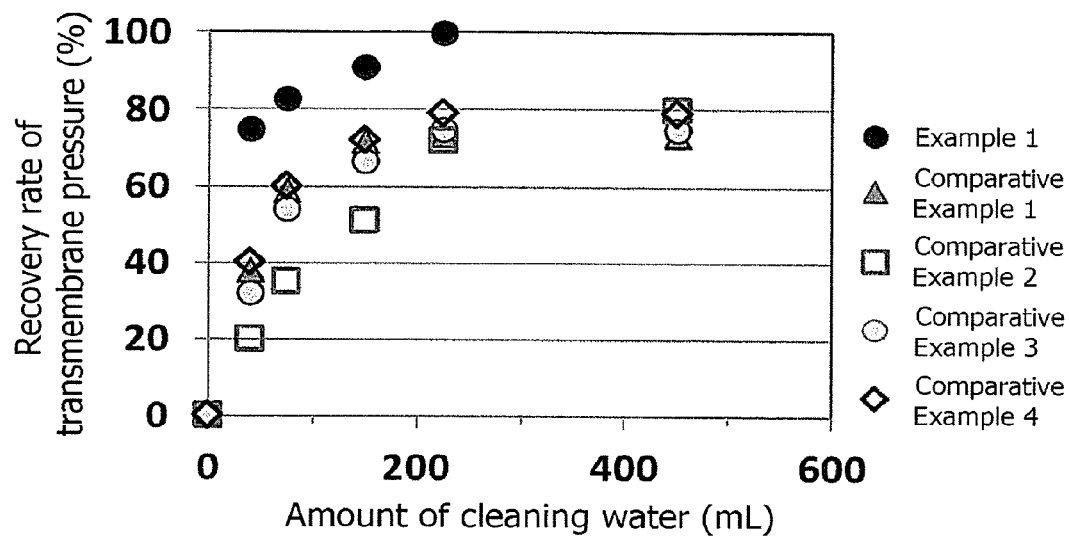
FIG. 15 is a graph showing the relationship between the amount of cleaning water used for backflow cleaning and the recovery rate of transmembrane pressure in Example 1 and Comparative Examples 1 to 4.

As is clear from the results in FIG. 15, in Example 1, the recovery rate of transmembrane pressure exceeded 80% when the amount of the cleaning water 8 was 75 mL, and the recovery rate of transmembrane pressure reached 100% when the amount of the cleaning water 8 was 225 mL. In contrast, in Comparative Examples 1 to 4, almost no increase was observed in the recovery rate of transmembrane pressure when the amount of the cleaning water 8 was 200 mL or more, confirming a tendency where the recovery rate of transmembrane pressure was saturated at about 80%.

As can be understood from the results, the use of the method for cleaning a filter membrane in Example 1 makes it possible to drastically improve the efficiency for cleaning a filter membrane.

Example 2

The following experiment was conducted using the same water treatment system comprising an apparatus for cleaning a filter membrane as in Example 1.

First, membrane bioreactor treatment was performed for water to be treated 1 for 12 minutes under the same conditions as those in Example 1, and then halted for 3 minutes. This treatment as one cycle was repeated for 96 cycles while measuring transmembrane pressure every 6 cycles. Next, with sodium hypochlorite as the 1$^{st}$ oxidizing agent and ozone as the 2$^{nd}$ oxidizing agent, the filter membrane was cleaned by backflow cleaning using cleaning water 8 containing sodium hypochlorite, the filter membrane was then cleaned by backflow cleaning using ozone-containing cleaning water 8, and then the transmembrane pressure was measured. Here, the concentration of sodium hypochlorite in the sodium hypochlorite-containing cleaning water 8 was 5000 mg/L, the concentration of ozone in the ozone-containing cleaning water 8 was 18 mg/L, the amount of the sodium hypochlorite-containing cleaning water 8 was 15 mL, the amount of the ozone-containing cleaning water 8 was 210 mL, and the time for cleaning was 15 minutes. The above treatment was performed once a day, and daily fluctuations in transmembrane pressure were evaluated.

Comparative Example 5

The following experiment was conducted using the same water treatment system comprising an apparatus for cleaning a filter membrane as in Comparative Example 1.

First, membrane bioreactor treatment was performed for water to be treated 1 for 12 minutes under the same conditions as those in Example 1, and then halted for 3 minutes. This treatment as one cycle was repeated for 96 cycles while measuring transmembrane pressure every 6 cycles. Next, with sodium hypochlorite as the 1$^{st}$ oxidizing agent, a filter membrane was cleaned by backflow cleaning using cleaning water 8 containing sodium hypochlorite, and then the transmembrane pressure was measured. Here, the concentration of sodium hypochlorite in the sodium hypochlorite-containing cleaning water 8 was 5000 mg/L, the amount of the sodium hypochlorite-containing cleaning water 8 was 225 mL, and the time for cleaning was 15 minutes. The above treatment was performed once a day, and daily fluctuations in transmembrane pressure were evaluated.

Comparative Example 6

The following experiment was conducted using the same water treatment system comprising an apparatus for cleaning a filter membrane as in Comparative Example 2.

First, membrane bioreactor treatment was performed for water to be treated 1 for 12 minutes under the same conditions as those in Example 1, and then halted for 3 minutes. This treatment as one cycle was repeated for 96 cycles while measuring transmembrane pressure every 6 cycles. Next, with ozone as the 2$^{nd}$ oxidizing agent, the filter membrane was cleaned by backflow cleaning using ozone-containing cleaning water 8, and then the transmembrane pressure was measured. Here, the concentration of ozone in the ozone-containing cleaning water 8 was 18 mg/L, the amount of the ozone-containing cleaning water 8 was 225 mL, and the time for cleaning was 15 minutes. The above treatment was performed once a day, and daily fluctuations in transmembrane pressure were evaluated.

Comparative Example 7

The following experiment was conducted using the same water treatment system comprising an apparatus for cleaning a filter membrane as in Comparative Example 3.

First, membrane bioreactor treatment was performed for water to be treated 1 for 12 minutes under the same conditions as those in Example 1, and then halted for 3 minutes. This treatment as one cycle was repeated for 96 cycles while measuring transmembrane pressure every 6 cycles. Next, with sodium hypochlorite as the $1^{st}$ oxidizing agent and ozone as the $2^{nd}$ oxidizing agent, a filter membrane was cleaned by backflow cleaning using cleaning water 8 containing ozone, the filter membrane was cleaned by backflow cleaning using cleaning water 8 containing sodium hypochlorite, and then the transmembrane pressure was measured. Here, the concentration of sodium hypochlorite in the sodium hypochlorite-containing cleaning water 8 was 5000 mg/L, the concentration of ozone in the ozone-containing cleaning water 8 was 18 mg/L, the amount of the sodium hypochlorite-containing cleaning water 8 was 15 mL, the amount of the ozone-containing cleaning water 8 was 210 mL, and the time for cleaning was 15 minutes. The above treatment was performed once a day, and daily fluctuations in transmembrane pressure were evaluated.

Comparative Example 8

The following experiment was conducted using the same water treatment system comprising an apparatus for cleaning a filter membrane as in Comparative Example 4.

First, membrane bioreactor treatment was performed for water to be treated 1 for 12 minutes under the same conditions as those in Example 1, and then halted for 3 minutes. This treatment as one cycle was repeated for 96 cycles in total while measuring transmembrane pressure every 6 cycles. Next, with sodium hypochlorite as the $1^{st}$ oxidizing agent and ozone as the $2^{nd}$ oxidizing agent, a filter membrane was cleaned by backflow cleaning using cleaning water 8 containing both sodium hypochlorite and ozone, and then the transmembrane pressure was measured. Here, the mixing ratio of sodium hypochlorite to ozone was the volume ratio of 50:50, the concentration of sodium hypochlorite was 5000 mg/L, the concentration of ozone was 18 mg/L in the cleaning water 8, the amount of the cleaning water 8 was 225 mL, and the time for cleaning was 15 minutes. The above treatment was performed once a day, and daily fluctuations in transmembrane pressure were evaluated.

Figure 16:
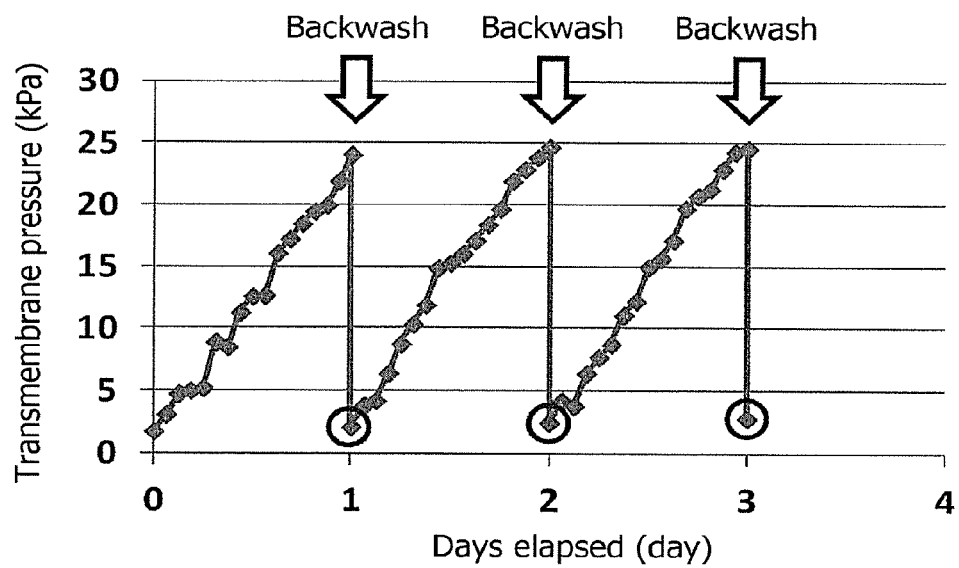
FIG. 16 is a graph showing the results in Example 2, transmembrane pressure for every 6 cycles of membrane bioreactor treatment and transmembrane pressure after backflow cleaning.
Figure 17:
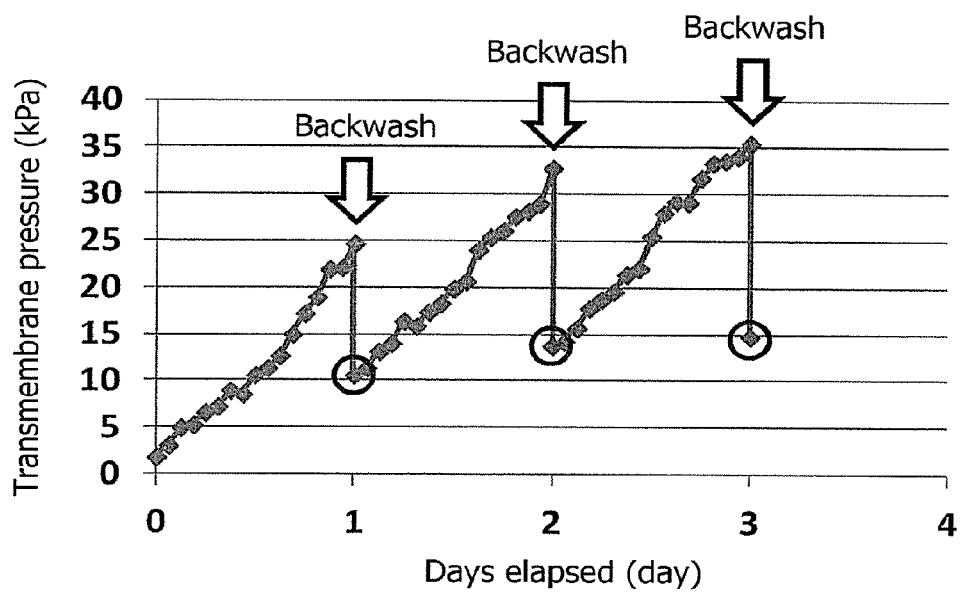
FIG. 17 is a graph showing the results in Comparative Example 6, transmembrane pressure for every 6 cycles of membrane bioreactor treatment and transmembrane pressure after backflow cleaning.

The results of measuring transmembrane pressure every 6 cycles of membrane bioreactor treatment and measuring transmembrane pressure after backflow cleaning in Example 2 are shown in FIG. 16, and the results of measuring transmembrane pressure every 6 cycles of membrane bioreactor treatment and measuring transmembrane pressure after backflow cleaning in Comparative Example 6 are each shown in FIG. 17.

In Example 2, as shown in FIG. 16, transmembrane pressure gradually increased when membrane bioreactor treatment was performed for water to be treated 1, however, the transmembrane pressure was successfully recovered by backflow cleaning to the level before membrane bioreactor treatment. In contrast, in Comparative Example 6, as shown in FIG. 17, backflow cleaning could lower the transmembrane pressure, however, the transmembrane pressure could not be recovered to the level before membrane bioreactor treatment, a tendency was observed in which repeated backflow cleaning resulted in increased transmembrane pressure after backflow cleaning. In addition, the results of Comparative Examples 5, 7 and 8 are not shown in the figures, but a tendency similar to that in Comparative Example 6 was observed in Comparative Examples 5, 7 and 8, such that the transmembrane pressure could not be recovered to the level before membrane bioreactor treatment, and repeated backflow cleaning resulted in increased transmembrane pressure after backflow cleaning.

Figure 18:
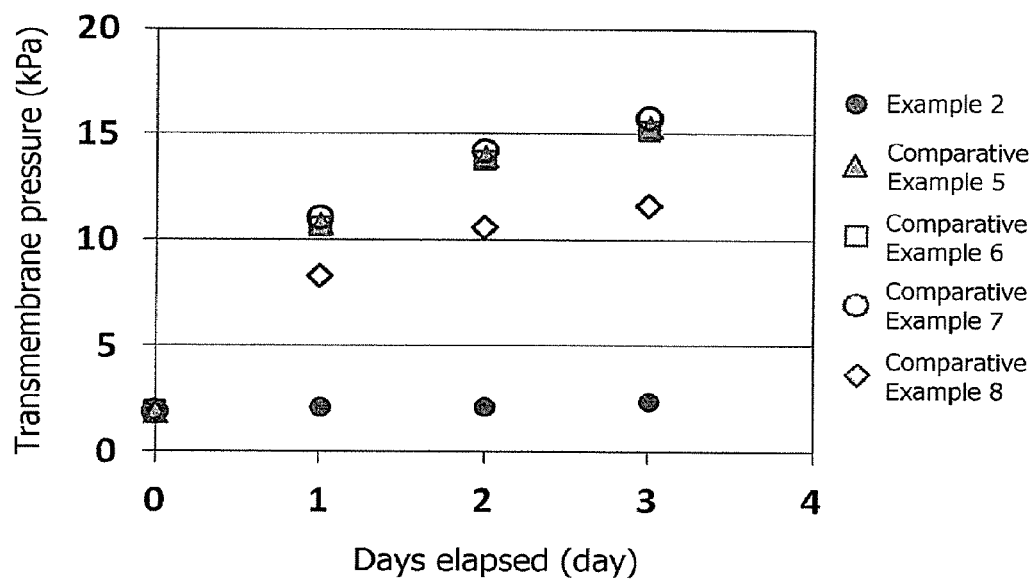
FIG. 18 is a graph showing changes over days in transmembrane pressure after backflow cleaning in Example 2 and Comparative Examples 5 to 8.

FIG. 18 shows changes in transmembrane pressure over days after backflow cleaning in Example 2 and Comparative Examples 5 to 8.

As shown in FIG. 18, in Comparative Examples 5 to 8, transmembrane pressure significantly increased on day 1 after backflow cleaning, and the transmembrane pressure gradually increased as days passed after backflow cleaning. In contrast, in Example 2, the transmembrane pressure was kept almost equivalent to that before membrane bioreactor treatment, not only on day 1 but also after several days passed.

As understood from the above results, according to the present invention, a method and an apparatus for cleaning a filter membrane can be provided, by which not only polluting substances adhered to the surface 100 of a filter membrane that comes into contact with water to be treated 1, but also polluting substances chemically adhered to the surface 101 of a filter membrane or into the pores 102 of the membrane that comes into contact with filtered water 103 can be efficiently removed while reducing the amounts of oxidizing agents and water to be used, and the filtration performance can be maintained for a long period of time.

This international application claims a priority based on Japanese patent application No. 2014-175329 filed on Aug. 29, 2014 and the entire content of this Japanese patent application is incorporated herein into the international application.

REFERENCE SIGN LIST

1 Water to be treated, 2 Water tank for water to be treated, 3 Membrane module, 4 Filtered water piping, 5 Supply piping for supplying water to be treated, 6 Filtration valve, 7 Filtration pump, 8 Cleaning water, 9 Cleaning water tank, 10 $1^{st}$ oxidizing agent storage tank, 11 $2^{nd}$ oxidizing agent storage tank, 12 Cleaning water piping, 13 Switching valve, 14 $1^{st}$ backwash piping, 15 $2^{nd}$ backwash piping, 16 $1^{st}$ oxidizing agent supply piping, 17 $2^{nd}$ oxidizing agent supply piping, 18 $1^{st}$ backwash valve, 19 $1^{st}$ backwash pump, 20 $2^{nd}$ backwash valve, 21 $2^{nd}$ backwash pump, 22 $1^{st}$ oxidizing agent supply valve, 23 $1^{st}$ oxidizing agent supply pump, 24 $2^{nd}$ oxidizing agent supply valve, 25 $2^{nd}$ oxidizing agent supply pump, 26 Cleaning water supply valve, 27 Cleaning water supply pump, 28 Pressure gauge, 29 Filtrate discharge piping, 30 Sludge drawing piping, 31 Sludge circulation piping, 32 Air diffuser, 33 Sludge drawing pump, 34 Sludge circulation pump, 35 Air supply piping, 36 Blower, 37 Tower for generating ozonated water, 38 Ozone supply piping, 39 Ozone generator, 40 Ozone reactor, 41 Waste ozone treatment facility, 42 Ozone supply piping, 43 Ozonated water piping, 44 Waste ozone piping, 45 Ozone gas storage tank, 46 Oxygen gas return piping, 47 Acid storage tank, 48 Acid supply piping, 49 Acid supply valve, 50 Acid supply pump, 51 Cleaning water supply valve, 52 Ejector, 53 pH meter, 54 Control device, 55 Signal wire, 100 Surface that comes into contact with water to be treated, 101 Surface that comes into contact with filtered water, 102 Pores, 103 Filtered water.

The invention claimed is:

1. A method for cleaning a filter membrane for water to be treated, comprising:
   a selecting step of selecting a first oxidizing agent and a second oxidizing agent, in which oxidizability of the first oxidizing agent is smaller than oxidizability of the second oxidizing agent;
   a first performing step of performing first backflow cleaning of the filter membrane by using first cleaning water containing sodium hypochlorite or hydrogen peroxide as the first oxidizing agent, wherein the first cleaning water is passed through the filter membrane;
   a second performing step of performing second backflow cleaning of the filter membrane by using second cleaning water containing ozone as the second oxidizing agent, wherein the second cleaning water is passed through the filter membrane, and
   wherein the second backflow cleaning with the ozone selected at the selecting step is performed after the first backflow cleaning with the sodium hypochlorite or hydrogen peroxide selected at the selecting step is performed.

2. The method for cleaning a filter membrane for water to be treated according to claim 1, wherein filtered water resulting from filtration treatment using the filter membrane is used as the first or second cleaning water.

3. The method for cleaning a filter membrane for water to be treated according to claim 1, wherein the filter membrane is cleaned by using cleaning water containing acid before backflow cleaning of the filter membrane using the first cleaning water containing the first oxidizing agent, or after backflow cleaning of the filter membrane using the second cleaning water containing the second oxidizing agent.

4. The method for cleaning a filter membrane for water to be treated according to claim 1, wherein the filter membrane is cleaned by using cleaning water with a pH of 5 or less containing acid and ozone after backflow cleaning of the filter membrane using the first cleaning water containing the first oxidizing agent.

5. The method for cleaning a filter membrane for water to be treated according to claim 1, further comprising:
   a step of performing backflow cleaning using cleaning water that contains no oxidizing agent between the first performing step and the second performing step.

6. The method for cleaning a filter membrane for water to be treated according to claim 1, wherein a concentration of the first oxidizing agent in the first cleaning water is 1000 mg/L or more and 10000 mg/L or less, and a volume ratio of the first cleaning water containing the first oxidizing agent to the second cleaning water containing the second oxidizing agent ranges from 10:90 to 50:50.

7. The method for cleaning a filter membrane for water to be treated according to claim 1, wherein an amount of the first cleaning water containing the first oxidizing agent is lower than an amount of the second cleaning water containing the second oxidizing agent.

* * * * *